US011425719B2

(12) United States Patent
Luo et al.

(10) Patent No.: US 11,425,719 B2
(45) Date of Patent: Aug. 23, 2022

(54) BEAM CONFIGURATIONS FOR MULTICAST AND BROADCAST COMMUNICATIONS

(71) Applicant: QUALCOMM Incorporated, San Diego, CA (US)

(72) Inventors: Tao Luo, San Diego, CA (US); Sony Akkarakaran, Poway, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/907,633

(22) Filed: Jun. 22, 2020

(65) Prior Publication Data

US 2020/0413391 A1    Dec. 31, 2020

Related U.S. Application Data

(60) Provisional application No. 62/867,795, filed on Jun. 27, 2019.

(51) Int. Cl.
*H04W 72/04*    (2009.01)
*H04W 4/06*    (2009.01)
(Continued)

(52) U.S. Cl.
CPC ........... *H04W 72/046* (2013.01); *H04W 4/06* (2013.01); *H04W 72/042* (2013.01);
(Continued)

(58) Field of Classification Search
CPC .................................................. H04W 72/046
(Continued)

(56) References Cited

U.S. PATENT DOCUMENTS

2014/0328329 A1* 11/2014 Novlan ............... H04W 56/002
370/336
2015/0257130 A1* 9/2015 Lee ....................... H04L 5/1469
370/336

(Continued)

OTHER PUBLICATIONS

3GPP TSG RAN, "3rd Generation Partnership Project; Technical Specification Group Radio Access Network; NR; Physical layer procedures for data (Release 15)", 3GPP Standard; Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V15.6.0 (Jun. 2019), Jun. 24, 2019 (Jun. 24, 2019), pp. 1-105, XP051754328, [Retrieved on Jun. 24, 2019] Section 5.2, chapter 5.1.5.

(Continued)

*Primary Examiner* — Lihong Yu
(74) *Attorney, Agent, or Firm* — Holland & Hart LLP; Kevin M. Donnelly

(57) ABSTRACT

Methods, systems, and devices for wireless communications are described. In some wireless communications systems, a base station may signal quasi co-location (QCL) information to a first user equipment (UE). Based on the QCL information, the first UE may determine one or more QCL parameters for communications (such as a receive beam or a transmit beam) for uplink, downlink, or sidelink operations. The first UE may signal the determined QCL parameters to a second UE using a sidelink channel. The second UE may use the QCL parameters to configure a beam for a communication link that the second UE may use to communicate with one or more of the first UE via the sidelink channel, one or more other UEs via additional sidelink channels, or one or more base stations via uplink or downlink transmissions.

30 Claims, 16 Drawing Sheets

(51) Int. Cl.
*H04W 92/10* (2009.01)
*H04W 92/18* (2009.01)

(52) U.S. Cl.
CPC ........ *H04W 72/0406* (2013.01); *H04W 92/10* (2013.01); *H04W 92/18* (2013.01)

(58) Field of Classification Search
USPC ........................................................ 375/267
See application file for complete search history.

(56) References Cited

U.S. PATENT DOCUMENTS

| | | |
|---|---|---|
| 2018/0376471 A1 | 12/2018 | Chae et al. |
| 2019/0045569 A1 | 2/2019 | Abedini et al. |
| 2019/0116467 A1* | 4/2019 | Belleschi ............. H04B 7/0626 |
| 2019/0173613 A1* | 6/2019 | Sorrentino ............ H04L 1/0029 |
| 2019/0261281 A1* | 8/2019 | Jung ..................... H04W 52/50 |
| 2020/0304253 A1* | 9/2020 | Choi ..................... H04L 5/0023 |
| 2020/0344034 A1* | 10/2020 | Moon ................... H04L 5/0092 |
| 2020/0413374 A1 | 12/2020 | Luo |
| 2021/0006456 A1* | 1/2021 | Kim .................. H04W 28/0278 |
| 2021/0212086 A1* | 7/2021 | Li ......................... H04W 72/14 |

OTHER PUBLICATIONS

International Search Report and Written Opinion—PCT/US2020/039146—ISA/EPO—dated Sep. 16, 2020.

\* cited by examiner

BEAM CONFIGURATIONS FOR MULTICAST AND BROADCAST COMMUNICATIONS

CROSS REFERENCE

The present application for patent claims the benefit of U.S. Provisional Patent Application No. 62/867,795 by LUO et al., entitled "BEAM CONFIGURATIONS FOR MULTICAST AND BROADCAST COMMUNICATIONS," filed Jun. 27, 2019, assigned to the assignee hereof and expressly incorporated by reference in its entirety.

TECHNICAL FIELD

The following relates generally to wireless communications, and more specifically to beam configurations for wireless communications, such as multicast and broadcast communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform spread orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as UEs. Some wireless communications systems may support direct communications between multiple communication devices, such as UEs, which may be referred to as sidelink communications over a sidelink channel. Examples of the direct communications (or sidelink communications) may include, but are not limited to, device-to-device (D2D) communications, vehicle-based communications, which may also be referred to as vehicle-to-pedestrian (V2P) networks, vehicle-to-everything (V2X) networks, vehicle-to-vehicle (V2V) networks, or cellular V2X (C-V2X) networks, among other examples.

SUMMARY

The described techniques relate to improved methods, systems, devices, and apparatuses that support beam configurations for wireless communications, such as multicast and broadcast communications. Generally, the described techniques provide for signaling quasi co-location (QCL) information to configure communication links for one or more of uplink, downlink, or sidelink communications. For example, a base station may signal QCL information to a wireless device, such as a first user equipment (UE). The QCL information may indicate that different signals may have a QCL relationship (for example, that the antenna ports used for transmitting the signals may share spatial characteristics). The first UE may determine one or more QCL parameters based on the QCL information, with which the first UE may adjust one or more aspects, for example a beam (such as a receive beam or a transmit beam) for one or more of uplink, downlink, or sidelink operations. In some implementations, the first UE may signal one or more of the determined QCL parameters or QCL information to a second UE using a sidelink channel. In this way the first UE can convey QCL information received from the base station or QCL parameters determined by the first UE to the second UE to facilitate unicast, multicast, broadcast, or other communications. The second UE may, in some examples, use the QCL parameters to configure a beam for a communication link that the second UE may use to communicate with the first UE via the sidelink channel, with one or more other UEs via one or more other sidelink channels, or with a base station via uplink transmissions or downlink transmissions (or both), or any combination thereof.

One innovative aspect of the subject matter described in this disclosure can be implemented in a method for wireless communication at a first UE. The method includes receiving, from a base station, a configuration message indicating QCL information associated with one or more of the first UE and a second UE; determining, based on the QCL information in the configuration message, one or more QCL parameters associated with the second UE; transmitting, to the second UE via a sidelink channel, the one or more QCL parameters associated with the second UE; and communicating, with the second UE via the sidelink channel based on the one or more QCL parameters, one or more of data information or control information.

Another innovative aspect of the subject matter described in this disclosure can be implemented in an apparatus for wireless communication at a first UE. The apparatus includes a processor, memory coupled with the processor, and instructions stored in the memory. The instructions may be executable by the processor to cause the apparatus to receive, from a base station, a configuration message indicating QCL information associated with one or more of the first UE and a second UE; determine, based on the QCL information in the configuration message, one or more QCL parameters associated with the second UE; transmit, to the second UE via a sidelink channel, the one or more QCL parameters associated with the second UE; and communicate, with the second UE, via the sidelink channel and based on the one or more QCL parameters, one or more of data information or control information.

Another innovative aspect of the subject matter described in this disclosure can be implemented in an apparatus for wireless communication at a first UE. The apparatus includes means for receiving, from a base station, a configuration message indicating QCL information associated with one or more of the first UE and a second UE; means for determining, based on the QCL information in the configuration message, one or more QCL parameters associated with the second UE; means for transmitting, to the second UE via a sidelink channel, the one or more QCL parameters associated with the second UE, and means for communicating, with the second UE, via the sidelink channel and based on the one or more QCL parameters, one or more of data information or control information.

Another innovative aspect of the subject matter described in this disclosure can be implemented in a non-transitory computer-readable medium storing code for wireless communication at a first UE. The code may include instructions executable by a processor to receive, from a base station, a configuration message indicating QCL information associated with one or more of the first UE and a second UE; determine, based on the QCL information in the configuration message, one or more QCL parameters associated with the second UE; transmit, to the second UE via a sidelink channel, the one or more QCL parameters associated with the second UE; and communicate, with the second UE, via the sidelink channel and based on the one or more QCL parameters, one or more of data information or control information.

Another innovative aspect of the subject matter described in this disclosure can be implemented in a method for wireless communication at a first UE. The method includes receiving, from a second UE via a sidelink channel or from a base station, one or more QCL parameters; identifying, at least one QCL parameter of the one or more QCL parameters received from the second UE or from the base station; and communicating with the second UE via the sidelink channel based on the at least one QCL parameter.

Another innovative aspect of the subject matter described in this disclosure can be implemented in an apparatus for wireless communication at a first UE. The apparatus includes a processor, memory coupled with the processor, and instructions stored in the memory. The instructions may be executable by the processor to cause the apparatus to receive, from a second UE via a sidelink channel or from a base station, one or more QCL parameters; identify, at least one QCL parameter of the one or more QCL parameters received from the second UE or from the base station; and communicate with the second UE via the sidelink channel based on the at least one QCL parameter.

Another innovative aspect of the subject matter described in this disclosure can be implemented in an apparatus for wireless communication at a first UE. The apparatus includes means for receiving, from a second UE via a sidelink channel or from a base station, one or more QCL parameters; means for identifying, at least one QCL parameter of the one or more QCL parameters received from the second UE or from the base station; and means for communicating with the second UE via the sidelink channel based on the at least one QCL parameter.

Another innovative aspect of the subject matter described in this disclosure can be implemented in a non-transitory computer-readable medium storing code for wireless communication at a first UE. The code may include instructions executable by a processor to receive, from a second UE via a sidelink channel or from a base station, one or more QCL parameters; identify, at least one QCL parameter of the one or more QCL parameters received from the second UE or from the base station; and communicate with the second UE via the sidelink channel based on the at least one QCL parameter.

Another innovative aspect of the subject matter described in this disclosure can be implemented in a method for wireless communication at a first UE. The method includes determining QCL information associated with a first UE and a second UE; transmitting, to the first UE, a configuration message including the QCL information; and communicating, with the second UE, based on transmitting the configuration message including the QCL information to the first UE.

Another innovative aspect of the subject matter described in this disclosure can be implemented in an apparatus for wireless communication at a first UE. The apparatus includes a processor, memory coupled with the processor, and instructions stored in the memory. The instructions may be executable by the processor to cause the apparatus to determine QCL information associated with a first UE and a second UE; transmit, to the first UE, a configuration message including the QCL information; and communicate, with the second UE, based on transmitting the configuration message including the QCL information to the first UE.

Another innovative aspect of the subject matter described in this disclosure can be implemented in an apparatus for wireless communication at a first UE. The apparatus includes means for determining QCL information associated with a first UE and a second UE; means for transmitting, to the first UE, a configuration message including the QCL information; and means for communicating, with the second UE, based on transmitting the configuration message including the QCL information to the first UE.

Another innovative aspect of the subject matter described in this disclosure can be implemented in a non-transitory computer-readable medium storing code for wireless communication at a first UE. The code may include instructions executable by a processor to determine QCL information associated with a first UE and a second UE; transmit, to the first UE, a configuration message including the QCL information; and communicate, with the second UE, based on transmitting the configuration message including the QCL information to the first UE.

DETAILED DESCRIPTION

Figure 1:
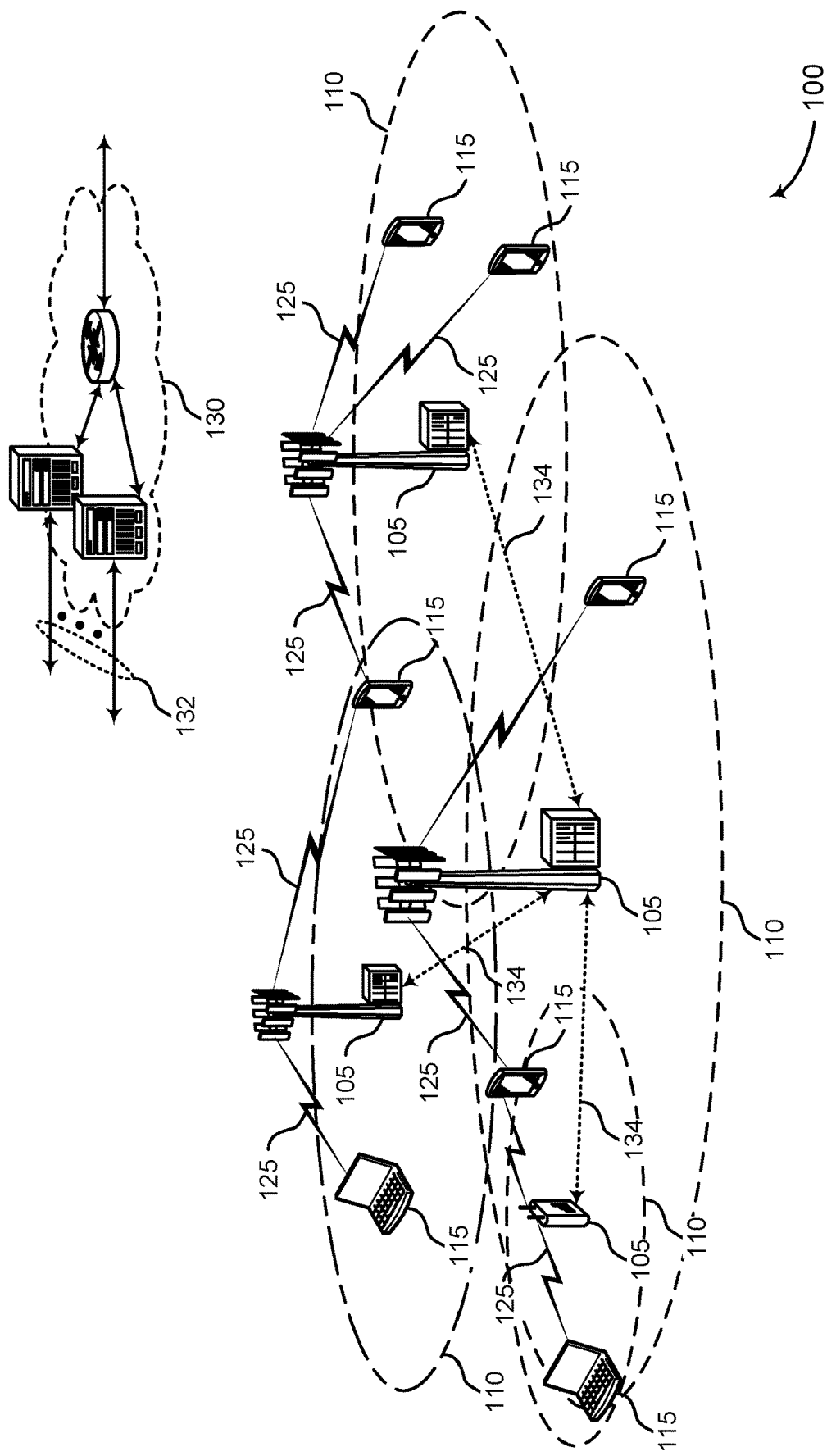
FIG. 1 illustrates an example of a wireless communications system that supports beam configurations for multicast and broadcast communications in accordance with aspects of the present disclosure.

Some wireless communications systems may support direct communications between multiple communication devices. Examples of direct communications may include, but are not limited to, device-to-device (D2D) communications, vehicle-based communications, which may also be referred to as vehicle-to-pedestrian (V2P) networks, vehicle-to-everything (V2X) networks, vehicle-to-vehicle (V2V) networks, or cellular V2X (C-V2X) networks, among other examples. In some examples, direct communications may be performed via sidelink operations over a sidelink channel, in which a communications link other than an access link (such as between a user equipment (UE) and a base station) may be used for communicating data directly between wireless devices. Such systems may further support communications using one or more radio access technologies including fourth generation (4G) systems such as Long Term Evolution (LTE) systems, fifth generation (5G) systems which may be referred to as New Radio (NR) systems, or Wi-Fi systems (such as wireless local area network (WLAN) systems).

In some examples, a wireless communications system may support communication on various radio frequency spectrum bands (such as including FR1 (450 to 6000 MHz), FR2 (24250 to 52600 MHz), and so forth). As such, base stations and UEs may operate in millimeter wave (mmW) frequency ranges, such as 28 gigahertz (GHz), 40 GHz, 60 GHz, and so on. Wireless communications at these frequencies may be associated with increased signal attenuation (such as pathloss), which may be influenced by various factors, such as temperature, barometric pressure, diffraction, and blockage, among other examples. As a result, signal processing techniques, such as beamforming, may be used to coherently combine energy and overcome the pathlosses at these frequencies. Such signal processing techniques may be used for direct communications between two or more wireless devices in the system.

Various aspects generally relate to the use of quasi co-location (QCL) information in wireless communications and, more specifically, to the use of QCL information to determine and adjust beam configurations. In some examples, QCL information or spatial relation information (such as different QCL types) may be signaled between wireless devices (such as from a base station to a UE). QCL information may indicate that different signals may have a QCL relationship (for example, that the antenna ports used for transmitting the signals may share one or more characteristics such as one or more spatial characteristics). In some examples, the UE may perform a beam sweeping procedure to determine QCL parameters for adjusting a beam (such as a receive beam or a transmit beam) for one or more of uplink, downlink, or sidelink operations. Additionally or alternatively, QCL information may be signaled between UEs using a sidelink channel to facilitate unicast, multicast, broadcast, or other communications. According to the techniques described herein, a first UE may receive QCL information related to sidelink communications with other devices (such as with other UEs). In some implementations, the first UE may indicate one or more QCL parameters, which may be determined by the first UE, to a second UE based on the QCL information. The second UE may, for example, use these QCL parameters to configure a beam for a communication link that the second UE may use for later communications with one or more of the first UE, with one or more other UEs, or with a base station. The techniques described herein may provide improved communication reliability and link quality between communication devices based on QCL information, for example, for uplink, downlink, and sidelink communications, among other benefits.

Aspects of the disclosure are initially described in the context of a wireless communications system. An example of a portion of a wireless communications system and a process flow are then provided in accordance with some aspects of the disclosure. Aspects of the disclosure are further illustrated by and described with reference to apparatus diagrams, system diagrams, and flowcharts that relate to beam configurations for multicast and broadcast communications.

FIG. 1 illustrates an example of a wireless communications system 100 that supports beam configurations for multicast and broadcast communications in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some examples, wireless communications system 100 may support enhanced broadband communications, ultra-reliable (such as mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (such as macro or small cell base stations). The UEs 115 described herein may be able to communicate with various types of base stations 105 and network equipment including macro eNBs, small cell eNBs, gNBs, and relay base stations, among other examples.

Each base station 105 may be associated with a specific geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as over a carrier), and may be associated with an identifier for distinguishing neighboring cells (such as a physical cell identifier (PCID), a virtual cell identifier (VCID)) operating via the same or a different carrier. In some examples, a carrier may support multiple cells, and different cells may be configured according to different protocol types (such as machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (such as a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, among other examples, which may be implemented in various articles such as appliances, vehicles, or meters, among other examples.

Some UEs 115, such as MTC or IoT devices, may be low cost or low complexity devices, and may provide for automated communication between machines (such as via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (such as according to narrowband communications). In some examples, UEs 115 may be designed to support critical functions (such as mission critical functions), and a wireless communications system 100 may be configured to provide ultra-reliable communications for these functions.

In some examples, a UE 115 may also be able to communicate directly with other UEs 115 (such as using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (such as via an S1, N2, N3, or other interface). Base stations 105 may communicate with one another over backhaul links 134 (such as via an X2, Xn, or other interface) either directly (such as directly between base stations 105) or indirectly (such as via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as radio heads and access network controllers) or consolidated into a single network device (such as a base station 105).

Wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (such as from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (such as LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as a base station 105) and a receiving device (such as a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (such as a base station 105 or a UE 115) to shape or steer an antenna beam (such as a transmit beam or receive beam) along a spatial path between the transmitting device and the receiving device. Beamforming may be achieved by combining the signals communicated via antenna elements of an antenna array such that signals propagating at specific orientations with respect to an antenna array experience constructive interference while others experience destructive interference. The adjustment of signals communicated via the antenna elements may include a transmitting device or a receiving device applying specific amplitude and phase offsets to signals carried via each of the antenna elements associated with the device. The adjustments associated with each of the antenna elements may be defined by a beamforming weight set associated with a specific orientation (such as with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as by the base station 105 or a receiving device, such as a UE 115) a beam direction for subsequent transmission and reception by the base station 105.

Some signals, such as data signals associated with a specific receiving device, may be transmitted by a base station 105 in a single beam direction (such as a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as for identifying a beam direction for subsequent transmission or reception by the UE 115), or transmitting a signal in a single direction (such as for transmitting data to a receiving device).

A receiving device (such as a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (such as when receiving a data signal). The single receive beam may be aligned in a beam direction determined based on listening according to different receive beam directions (such as a beam direction determined to have a highest signal strength, highest signal-to-noise ratio (SNR), or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (such as in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (such as an Evolved Universal Terrestrial Radio Access (E-UTRA) absolute radio frequency channel number (EARFCN)), and may be positioned according to a channel raster for discovery by UEs 115. Carriers may be downlink or uplink (such as in an FDD mode), or be configured to carry downlink and uplink communications (such as in a TDD mode). In some examples, signal waveforms transmitted over a carrier may be made up of multiple sub-carriers (such as using multi-carrier modulation (MCM) techniques such as orthogonal frequency-division multiplexing (OFDM) or discrete Fourier transform spread OFDM (DFT-s-OFDM)).

The organizational structure of the carriers may be different for different radio access technologies (such as LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (such as synchronization signals or system information, among other examples) and control signaling that coordinates operation for the carrier. In some examples (such as in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (such as between a common control region or common search space and one or more UE-specific control regions or UE-specific search spaces).

A carrier may be associated with a specific bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a specific radio access technology (such as 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (such as set of subcarriers or RBs) within a carrier (such as "in-band" deployment of a narrowband protocol type).

In a system employing MCM techniques, a resource element may include one symbol period (such as a duration of one modulation symbol) and one subcarrier, where the symbol period and subcarrier spacing are inversely related. The number of bits carried by each resource element may depend on the modulation scheme (such as the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as spatial layers), and the use of multiple spatial layers may further increase the data rate for communications with a UE 115.

Devices of the wireless communications system 100 (such as base stations 105 or UEs 115) may have a hardware configuration that supports communications over a specific carrier bandwidth, or may be configurable to support communications over one of a set of carrier bandwidths. In some examples, the wireless communications system 100 may include base stations 105, UEs 115, or both, that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (such as when multiple serving cells have a suboptimal or non-ideal backhaul link). An eCC may also be configured for use in unlicensed spectrum or shared spectrum (such as where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (such as according to frequency channel or carrier bandwidths of 20, 40, 60, 80 MHz, and so on) at reduced symbol durations (such as 16.67 microseconds). A TTI in eCC may include one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (such as across the frequency domain) and horizontal (such as across the time domain) sharing of resources.

Beamforming, which may also be referred to as spatial filtering, directional transmission, or directional reception, is a signal processing technique that may be used at a transmitting device or a receiving device (such as a base station 105 or a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at specific orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (such as with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or a receiving device, such as a UE 115) a beam direction for subsequent transmission and reception by the base station 105.

Some signals, such as data signals associated with a specific receiving device, may be transmitted by a base station 105 in a single beam direction (such as a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some examples, transmissions by a device (such as by a base station 105 or UE 115) may be performed using multiple beam directions, and the device may use a combination of digital precoding or radio frequency beamforming to generate a combined beam for transmission (such as from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) if receiving various signals from the base station 105, such as synchronization signals, reference signals, beam selection signals, synchronization signal blocks (SSBs) (such as including a primary synchronization signal (PSS), secondary synchronization signal (SSS), broadcast information (such as a physical broadcast channel (PBCH)), among other examples), or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as if receiving a data signal). The single receive configuration may be aligned in a beam direction determined based on listening according to different receive configuration directions (such as a beam direction determined to have a highest signal strength, highest SNR, or otherwise acceptable signal quality based on listening according to multiple beam directions).

In some examples, the properties of a signal transmitted using a specific directional beam may be derived from the properties of another signal transmitted over a similar beam. A QCL relationship between one or more transmissions or signals may, for example, refer to a spatial relationship between the antenna ports (and the corresponding signaling beams) of the respective transmissions. For example, one or more antenna ports may be implemented by a base station 105 for transmitting one or more reference signals and control information transmissions to a UE 115. The channel properties of the signals sent via the different antenna ports, however, may be interpreted (such as by a receiving device) to be the same (such as despite the signals being transmitted from different antenna ports), and the antenna ports (and the respective beams) may be determined to be quasi co-located (QCLed) with respect to these channel properties. In such cases, the UE 115-*b* may have respective antenna ports for receive beams used for receiving the QCLed transmissions (such as the reference signal). In some examples, QCLed signals may enable the UE 115 to determine the properties of a first signal (such as delay spread, Doppler spread, frequency shift, average power, and spatial receive filter, among other examples) transmitted on a first antenna port from measurements made on a second signal transmitted via a second antenna port.

In some examples, different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. QCL-TypeD may refer to a QCL relationship of spatial receive parameters, which may indicate a relation between two or more directional beams used to receive (or, in other implementations, to transmit) signals. In some examples, the spatial parameters may indicate that a first beam used to transmit a first signal may be similar to (or the same as) another beam used to transmit a second, different signal. In some implementations, the spatial parameters may indicate that a first beam used to receive a first signal may be similar to (or the same as) another beam used to receive a second, different signal (such as the second signal being received using a narrow beam within a particular angular coverage of a first, broad beam). Thus, the beam information for various beams may be derived through receiving signals from a transmitting device, in which, in some examples, the QCL information (such as spatial information) may help a receiving device efficiently and effectively identify communications beams, for example, without sweeping through a large number of beams to identify a preferred or "best" beam with a relatively high signal quality.

In some examples, QCL information, for example information associated with spatial relation information, (such as different QCL types) may be indicated through signaling from one wireless device (such as a base station 105 or UE 115) to another. For instance, a UE 115 may be configured with one or more transmission configuration indication (TCI) states, in which a TCI state may indicate a specific QCL relation for one or more signals. In some examples, TCI state information may be signaled to a UE 115 via higher layer signaling (such as via an RRC information element or other configuration signaling). Additionally or alternatively, QCL information may be signaled between respective UEs 115 using a sidelink channel. As such, one or more of the UEs 115 may identify QCL information to use for sidelink communications with another UE 115.

The wireless communications system 100 may support the indication of QCL information (for example, spatial relation information) for any of downlink communications, uplink communications, and sidelink communications. According to the techniques described herein, a first UE 115 may receive QCL information related to other devices (such as other UEs 115) with which the UE 115 may communicate. In some implementations, the first UE 115 may indicate one or more QCL parameters to a second UE based on the QCL information received from another device, such as a base station 105. In some implementations, the QCL information received from the base station 105 may indicate a set of access-link signals (such as signals between a base station 105 and a UE 115), sidelink signals (such as signals between two UEs 115), or both, that may act as QCL reference signals, that is, reference signals with which other sidelink signals may be indicated to be QCL-ed to be used for sidelink communication. The second UE 115 may use these QCL parameters to, for example, perform beam refinement procedures to update or modify communication links for one or more communications with the first UE 115, with one or more other UEs 115, or one or more base stations 105, or any combination thereof. Accordingly, the techniques described herein may provide relatively improved communications reliability and link quality, among other benefits, at the second UE 115 based on the QCL parameters.

Figure 2:
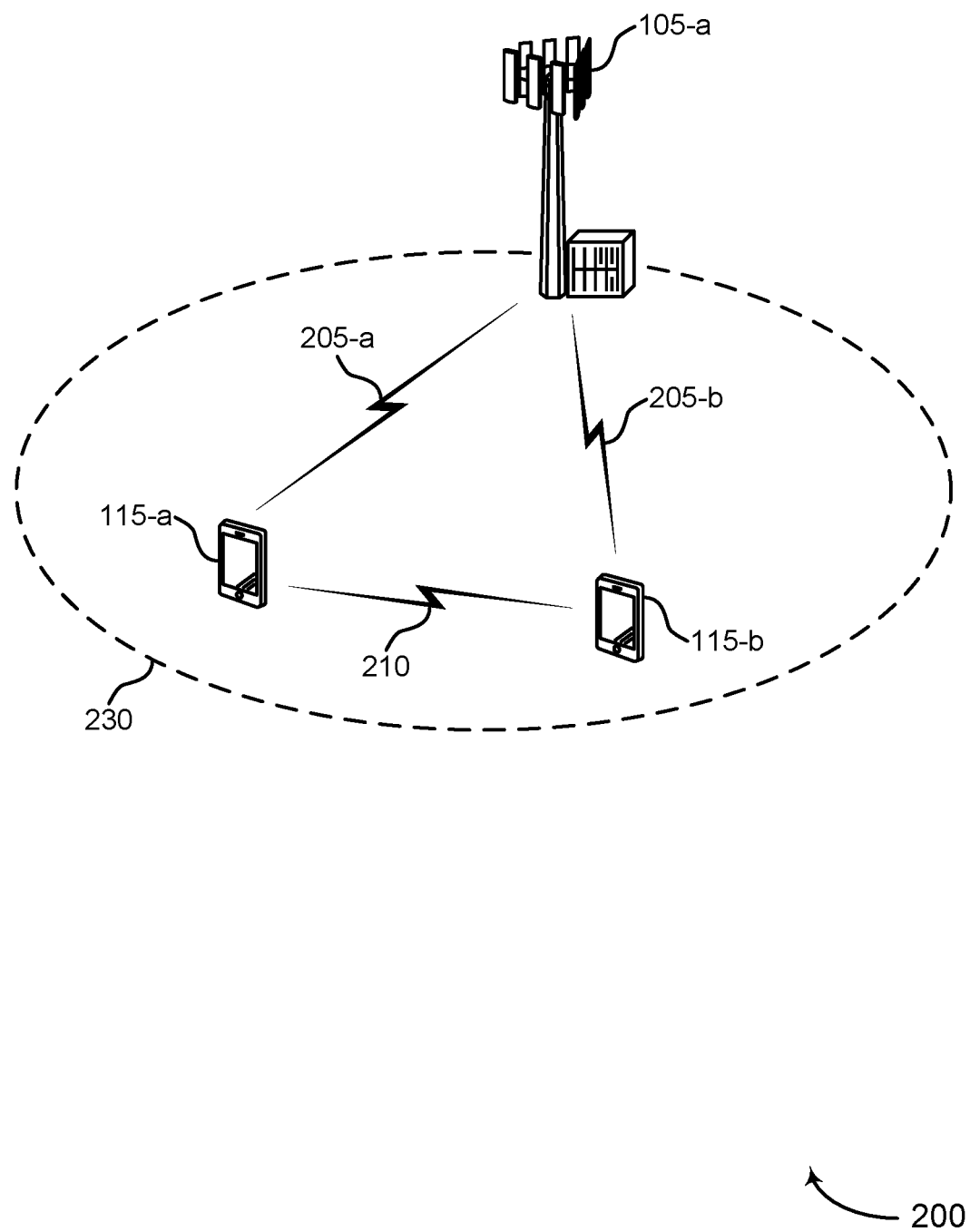
FIG. 2 illustrates an example of a portion of a wireless communications system that supports beam configurations for multicast and broadcast communications in accordance with aspects of the present disclosure.

FIG. 2 illustrates an example of a portion of a wireless communications system 200 that supports beam configurations for multicast and broadcast communications in accordance with aspects of the present disclosure. In some examples, the wireless communications system 200 may implement aspects of the wireless communications system 100. In the example of FIG. 2, the wireless communications system 200 may include one or more base stations 105 in communication with one or more UEs 115. For example, the illustrative example of FIG. 2 shows a base station 105-a in communication with a first UE 115-a and a second UE 115-b, which may each be examples of the corresponding devices described with reference to FIG. 1. The base station 105-a may provide network coverage for a geographic coverage area 230. The UEs, such as the first UE 115-a and the second UE 115-b, in the wireless communications system 200 may support sidelink communications using one or more transmissions, such as directional (such as beamformed) transmissions. Wireless communications system 200 may also support multicast and broadcast transmissions, for example, from a device (such as the base station 105-a), with which the base station may simultaneously or concurrently transmit to multiple other devices (such as the UEs 115). Although FIG. 2 shows two UEs 115 as an example, the base station 105-a may use multicast and broadcast communications to communicate with any number of UEs 115 within or near the coverage area 230.

In wireless communications system 200, the base station 105-a may communicate with one or more UEs 115 over corresponding access links 205. For example, the base station 105-a may communicate with the first UE 115-a using a first access link 205-a, and the base station 105-a may communicate with the first UE 115-a using a second access link 205-b. In some examples, the access links 205 may each be an example of a communication link 125, as described with reference to FIG. 1, and may correspond to a radio interface (such as a Uu interface) between the corresponding UE 115 and a radio access network. The base station 105-a may transmit control information (such as downlink control information (DCI)) and data on the downlink to the UEs 115 over the corresponding access links 205. Likewise, the UEs 115 may communicate control information and data to the base station 105-a on the uplink using the access links 205. In some examples, the access links 205 may be directional links, that is, they may be links beamformed from the base station 105-a, between the base station 105-a and the corresponding UEs 115.

Additionally, the UEs 115 may communicate using a sidelink communication link 210, for example, a sidelink channel between the UE 115-a and the UE 115-b. The sidelink communication link 215 may be an example of a communication link 135 described with reference to FIG. 1. In some examples, the sidelink communication link 210 may correspond to a radio interface between two devices that may not use assistance from a network (such as a PC5 or V2X interface). In some examples, the sidelink communication link 215 may be a directional link between the UE 115-a and the UE 115-b, for example, formed using beamforming techniques (such as with mmW communications).

In some implementations, the UEs 115 may communicate with one or more other devices using one or more respective sidelink communication links 210. For example, the UE 115-b may communicate with UE 115-c using a sidelink communication link 215-a, and may also communicate with a third UE 115 using another sidelink communication link, while communicating with the first UE 115-a over the sidelink communication link 210. The UEs 115 that communicate over the one or more sidelink communication links 210 may transmit control information and data over the sidelink channel.

In some implementations, different functions of the base station 105-a may be distributed across various network devices, for example, across multiple TRPs. Multiple TRPs may jointly transmit downlink communications to one or more receiving devices of a group of devices, for example, to one or more of the UEs 115 (or alternatively, to one or more integrated access and backhaul (IAB) nodes, mobile relays, and other base stations 105, among other examples).

In some implementations, the receiving devices, for example one or both of the UEs 115, may provide feedback to the base station 105-a in response to receiving the downlink communications from the base station 105-a. The feedback may indicate, for example, whether the respective UE 115 successfully received a corresponding downlink communication. The feedback may include, for example, layer 1 feedback (such as acknowledgement (ACK), negative acknowledgement (NACK), or discontinuous transmission (DTX) feedback) or layer 2 feedback (such as feedback signaled in a MAC control element (CE)).

In some implementations (such as in an mmW communications system), the base station 105-a may communicate with the UEs 115 using directional beamformed communication links. The base station 105-a may perform a beam sweeping procedure (or beam training procedure) to determine a directional beam for the access link 205-a with which the base station 105-a may communicate with the 115-a. For example, the base station 105-a may transmit a series of SSBs to the UE 115-a using different directional beams, and, based on feedback received from the UE 115-*a*, the base station 105-*a* may select a specific beam to use for the access link 205-*a*.

Similarly, in some implementations, the UEs 115 may communicate over the sidelink communication link 210 using one or more directional beams, for example, after similarly performing a beam sweeping procedure to obtain the directional beam or beams to be used for the sidelink communication link 210. Signaling of QCL information and spatial relation information may be used to facilitate sidelink operations, in which the QCL information may indicate to a transmitting device, such as the UE 115-*a*, one or more specific beams to use for beamformed sidelink transmission.

For example, the base station 105-*a* may transmit one or more reference signals (such as CSI-RSs, sounding reference signals (SRSs), DMRSs, and PBCHs, among other examples) to the UE 115-*a* associated with QCL information (such as a QCL relationship, a spatial relationship between two antenna ports, or an indication of the reference signals that may be used to establish a reference or source for QCL for the sidelink), for example, the reference signals to be used as a source for the QCL information, or, in some implementations, including or being transmitted substantially simultaneously with the QCL information. Accordingly, the UE 115-*a* may use the reference signals as a source for QCL information. The UE 115-*a* may use the QCL information, which may be or include spatial relationship information, to receive subsequent signals using specific channels according to the indicated QCL information. QCL information may include a number of different parameters, in which different types of QCL may include different combinations of the parameters, such as QCL-Types A, B, C, and D, or other combinations of possible parameters. Different types of QCL may include information that may be relatively more suitable for different situations or for different types of signaling, according to the specific parameters indicated in the QCL information. In some implementations, the base station 105-*a* may transmit multiple downlink reference signals (for example, two reference signals) to signal the use of one or more combinations of QCL types (for example, the combination of QCL Type C and QCL Type D).

In some implementations, such as in wireless communications systems in which the base station 105-*a* implements broadcast or multicast communications, QCL signaling may be used to facilitate any of downlink communications on the access links 205, uplink communications on the access links 205, and sidelink communications using the sidelink communication link 210. For example, broadcast and multicast communications may include a number of individually beamformed signals transmitted to each receiving device, and QCL information may be provided for each communication link of the broadcast or multicast transmission, for example, to refine a beam used for the sidelink communication link 210 between UEs 115. Accordingly, a device, such as the UE 115-*a*, may receive such QCL information, which may relate to sidelink transmissions to specific UEs 115, such as to the UE 115-*b*. Based on the received QCL information, the UE 115-*a* may transmit (such as via a control channel of the sidelink channel) an indication of the QCL information to the UE 115-*b*, which one or more of the UEs 115 may use to determine, for example, specific channels or other beam parameters for sidelink communications between the UEs 115 or uplink or downlink communications related to one or more TRPs or base stations, or a combination thereof.

In some implementations, a set of one or more signals may be communicated from one or many sources to use QCL for beam training for control signaling, data transmissions, or both. A device receiving the set of signals may use QCL information from the signals to configure another communication link. For example, the base station 105-*a* may transmit a set of signals including QCL information to the UE 115-*a* for the UE 115-*a* to use to configure a communication link, for example, the sidelink communication link 210 to communicate with UE 115-*b*. In some implementations, the base station 105-*a* transmits each signal to one or more UEs 115 from a same cell or TRP associated with the same cell. Alternatively, the functions of the base station 105-*a* may be distributed across different TRPs or base stations or both. For example, different TRPs of a cell (such as of the serving cell) may transmit one or more of the set of signals to the UE 115-*a*. In some implementations, different base stations 105 in different cells may transmit one or more of the set of signals to the UE 115-*a* (such as for Coordinated MultiPoint (CoMP) communications). In other similar implementations, the TRPs and base stations 105 may receive one or more signals.

In some implementations, the one or more TRPs may share a same cell identifier, but may include different QCL information as communications to or from the different TRPs may be associated with different channels. Additionally or alternatively, one or more of the set of signals may be a sidelink communication from, for example, further UEs 115 in or near the coverage area 230. The UE 115 may also use knowledge of QCL information from, for example, previous uplink communications associated with one or more other devices. In this way, the set of signals from which the UE 115-*a* may gather QCL information may include any combination of downlink, uplink, or sidelink communications (including signals such as SSBs, CSI-RSs, SRSs, physical random access channels (PRACHs), and DMRSs that may include control information, data, or both, and other like signaling).

The UE 115-*a* receiving these QCL signals may use the QCL information included in one or more QCL signals to configure the sidelink communication link 210 for communications with the UE 115-*b*. In some implementations, the set of received QCL signals may be separately configured for one or more of downlink, uplink, or sidelink communications. That is, for example, a first subset of signals from the set of signals may be configured with QCL information that is to be used to configure an uplink beam (such as for a transmit beam to communicate with the base station 105-*a* over the access link 205-*a*). A second subset of signals from the set of signals may be configured with QCL information that is to be used to configure a downlink beam (such as for a receive beam to communicate with the base station 105-*a* over the access link 205-*a*). A third subset of signals from the set of signals may be configured with QCL information that is to be used to configure a sidelink beam (such as for a beam to communicate with the UE 115-*b* over the sidelink communication link 210). In some examples, these different subsets of the signals may be included in a list that may be communicated between two or more devices (such as a base station and a UE). For example, a first number of entries (in a list) may include QCL information or parameters associated with uplink communications, a second number of entries (in the list) may include QCL information or parameters associated with downlink communications, and a third number of entries (in a list) may include QCL information or parameters associated with sidelink communications.

Additionally or alternatively, the set of received QCL signals may be configured to be used for channels, or signals, or both. For example, respective ones of the QCL signals (such as reference signals or SSBs) may be channel-specific, that is, the UE 115-*a* may use the QCL information of this QCL signal to configure a channel. Similarly, respective ones of the QCL signals (such as one or more reference signals or one or more SSBs) may be signal-specific, that is, the UE 115-*a* may use the QCL information of this QCL signal to configure respective types of signals. In some implementations, respective ones of the QCL signals may be based on whether the respective transmission is a broadcast, multicast (or group-cast), or unicast transmission.

In this way, the UE 115-*a* may maintain a list including a number of QCL signals, for example, that may be from different sources (including different cells, device, and TRPs, among other examples), that may include different QCL information, and that may be used to configure different types of signals or channels. The UE 115-*a* may identify that the UE 115-*a* is to communicate with, for example, a new device or that the UE 115-*a* is to use a new communication link, and the UE 115-*a* may select a specific subset of the QCL signals from the list that may facilitate configuring the new communication link. In some implementations, the base station 105-*a* may provide the list of different QCL signals to the UE 115-*a*, for example, in a configuration message.

The configuration message may include one or more fields (such as an RRC message including a number of information elements) that may include corresponding indicators that may respectively indicate, for example, one or more of the different sources of QCL information (such as one or more fields to identify a cell, device, or TRP, among other examples), different transmission types (such as different ones of SSBs, and reference signals such CSI-RSs, among other examples), different QCL parameter types, different channels, different cell identifiers or virtual cell identifiers (for example, to select TRPs identified by a specific virtual cell identifier), and other like parameters. In some implementations, one or more of the values of the configuration message may be configured with a default value, in which if the configuration message does not include that field, or an indicator bit for that field, the UE 115-*a* may use the default value (such as defaulting to QCL signals received from a serving cell rather than QCL signals received from non-serving cells).

The UE 115-*a* may receive the configuration message indicating the subset of QCL signals, and thus subset of received QCL information, that the UE 115-*a* may process to determine one or more QCL parameters for the associated communication link. The QCL parameters may include, for example, a spatial relationship or spatial filter (such as a receive spatial filter), a timing to use for communications (such as a receive timing), a resource allocation, a power control parameter (such as a receive power or a transmit power), and other like parameters. In some implementations, the QCL parameters may be indicated to be used as downlink, uplink, or sidelink QCL parameters.

In this way, the UE 115-*a* may similarly transmit a message, such as its own configuration message (which may, in some implementations, itself include additional QCL information), to the UE 115-*b* to indicate a configuration or QCL parameters for the UE 115-*b* to use to configure a communication link, as similarly described herein for the UE 115-*a*. For example, the UE 115-*a* may receive a configuration message from the base station 105-*a* via the access link 205-*a*, including or in addition to one or more QCL signals including various QCL information (such as from the base station 105-*a* in the serving cell of the UE 115-*a* and from multiple other base stations 105 in other cells). The configuration message may indicate that the UE 115-*a* is to communicate with the UE 115-*b* via the sidelink communication link 210 (for example, using specific parameters for a transmit beam), and further that the UE 115-*a* is to configure the UE 115-*b* for the sidelink communications. The UE 115-*a* may transmit a configuration message to the UE 115-*b*, for example, including specific QCL information or QCL parameters that the UE 115-*b* is to use to use to configure a receive beam to communicate with the UE 115-*a*.

In some implementations, the UE 115-*a* may receive an anchor signal, for example, from the base station 105-*a* with or included in one or more QCL signals. The UE 115-*a* may measure the anchor signal to determine, for example, a receive timing, and a power control parameter, among other examples (that is, rather than according to an explicit configuration). In some implementations, rather than using a specific QCL parameter indicated by, for example, a field of a received configuration message, the UE 115-*a* may derive QCL parameters based on QCL information in received QCL signals.

For example, the UE 115-*a* may be configured with a capability to derive an uplink spatial reference to be used for a specific type of uplink transmission based on QCL information that the UE 115-*a* has received in downlink QCL signals. Additionally or alternatively, the UE 115-*a* may derive a downlink spatial reference to be used for a specific type of downlink transmission based on QCL information that the UE 115-*a* has identified from uplink QCL signals (such as based on a beam correspondence between a shape for transmit and receive beams). In some implementations, the UE 115-*a* may determine one or more QCL parameters (such as spatial reference information) based on an anchor signal, for example, according to a signal type of anchor signal, or according to a signal metric (such as a signal strength or signal quality) of the anchor signal, or both. Additionally or alternatively, the UE 115-*a* may perform a beam training sequence to determine the spatial reference for that specific signal.

Figure 3:
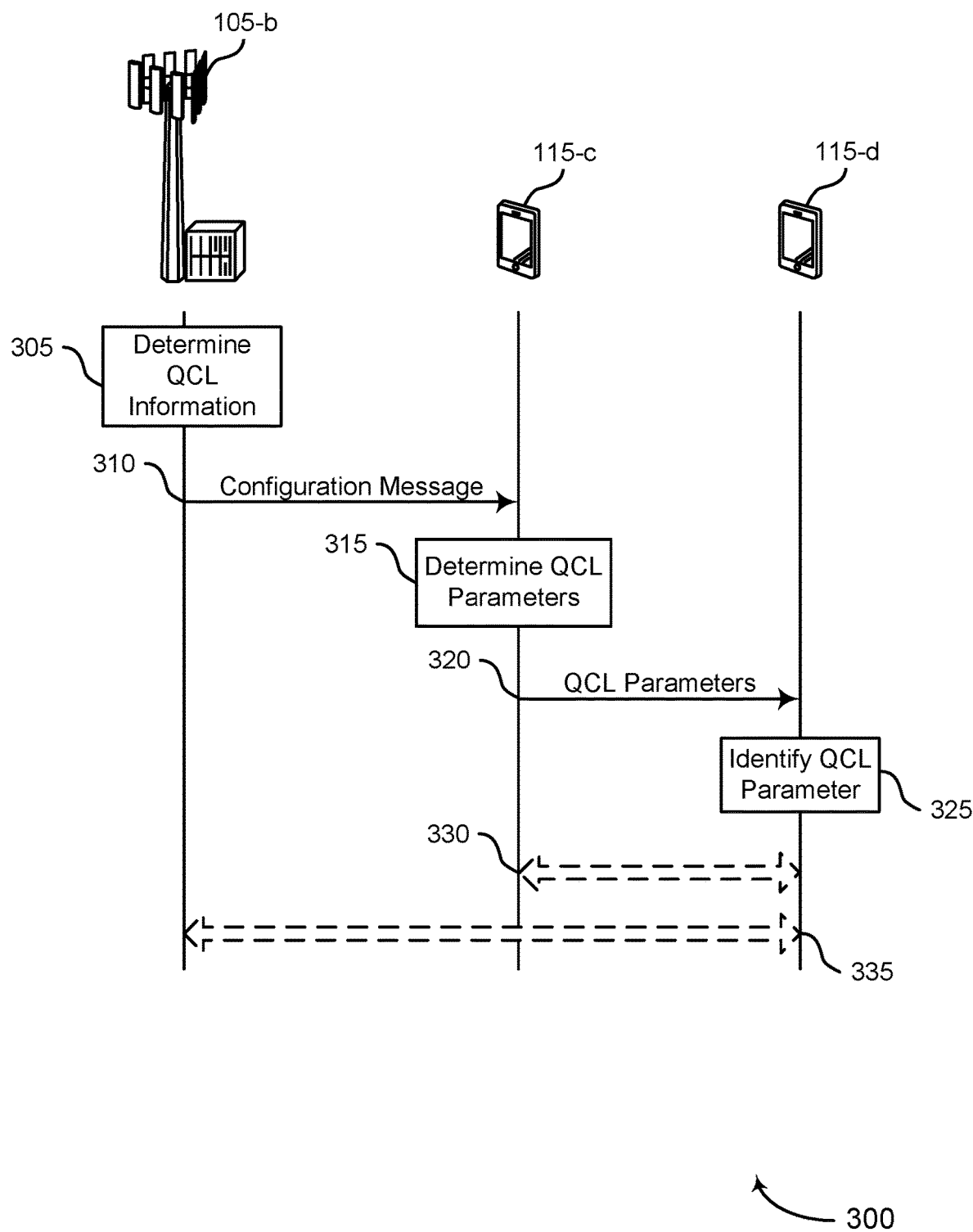
FIG. 3 illustrates an example of a process flow that supports beam configurations for multicast and broadcast communications in accordance with aspects of the present disclosure.

FIG. 3 illustrates an example of a process flow 300 that supports beam configurations for multicast and broadcast communications in accordance with aspects of the present disclosure. In some examples, the process flow 300 may be implemented by aspects of the wireless communications system 100 or 200. The process flow 300 may include a base station 105-*b*, a UE 115-*c*, and a UE 115-*d*, which may be examples of the corresponding devices described with reference to FIGS. 1 and 2. Alternative examples of the following may be implemented, in which some steps are performed in a different order than described or are not performed at all. In some examples, steps may include additional features not mentioned below, or further steps may be added.

At 305, the base station 105-*b* may determine QCL information associated with one or more of the UE 115-*c* or the UE 115-*d*. In some implementations, the QCL information may include Doppler shift information, Doppler spread information, average delay information, or delay spread information, other information, or any combination thereof. In some implementations, the QCL information may include information indicating how the UE 115-*d* is to communicate with the base station 105-*d*.

At 310, the base station 105-*b* may transmit to the UE 115-*c*, and the UE 115-*c* may receive from the base station 105-*b*, a configuration message indicating QCL information associated with the UE 115-*c* and the UE 115-*d*. In some implementations, the base station 105-*b* may transmit the configuration message to the UE 115-*c* in an SSB, RRC message, MAC CE a CSI-RS, a PRACH, a DMRS, or any combination thereof. In some implementations, the base station 105-*b* may transmit the configuration message to the UE 115-*c* in an RRC message that includes one or more indices related to an SSB, a CSI-RS, a PRACH, a DMRS, or other like signaling.

In some implementations, the UE 115-*c* may receive one or more configuration messages (such as a second configuration message) indicating additional QCL information associated with the UE 115-*c* or the UE 115-*d*, for example, from one or more base stations 105, and UEs 115, among other examples. In some implementations, the configuration message and the second configuration message may be received from different base stations 105 in different cells or from different transmission reception points that may be in a same cell or in different cells. In some implementations, the configuration message and the second configuration message may be received from one or more devices (such as one or more TRPs associated with a base station 105) in a same cell. In some implementations, the UE 115-*c* may receive one or more communications that have one or more fields indicating one or more QCL parameter types, one or more QCL transmission types, one or more cell identifiers identifying a device (such as identifying the base station 105-*b*) associated with the configuration message, one or more virtual cell identifiers identifying a device (such as a TRP) associated with the configuration message, or any combination thereof.

In some implementations, the base station 105-*b* may transmit to the UE 115-*c*, and the UE 115-*c* may receive from the base station 105-*b*, an anchor signal (for example, included in the signaling including the configuration message at 310). In some implementations, the base station 105-*b* may transmit to the UE 115-*c*, and the UE 115-*c* may receive from the base station 105-*b*, an indication of a QCL type, for example, as may have been received in the configuration message at 310.

At 315, the UE 115-*c* may determine, based on the QCL information in the configuration message, as may have been received in the configuration message at 310, one or more QCL parameters associated with the UE 115-*d*. In some implementations, the QCL parameters may include downlink QCL parameters, uplink QCL parameters, or sidelink QCL parameters. In some implementations, the QCL parameters may include channel-specific QCL parameters, or signal-specific QCL parameters, or both. In some implementations, the QCL parameters may include a resource allocation, a spatial relationship, a spatial filter, a power control parameter, or any combination thereof.

In some implementations, the UE 115-*c* may determine one or more QCL parameters based on a downlink QCL signal, for example, a signal that may be received at 310 with, or including, the configuration message. Additionally or alternatively, in some implementations, the UE 115-*c* may determine one or more QCL parameters based on an uplink QCL signal, for example, a signal that the UE 115-*c* may have transmitted or that the UE 115-*c* may later transmit, to the base station 105-*c* or another wireless communications device.

In some implementations, the UE 115-*c* may determine the QCL parameters based on information in the anchor signal, as may have been received at 310, a signal strength of the anchor signal, or an autonomous operation by the UE 115-*c* (such as a beam sweeping procedure). In some implementations, the UE 115-*c* may determine the QCL parameters based on the QCL type associated with the QCL information, as may have been received in the configuration message at 310. In some implementations, the QCL type may be identified or determined according to the QCL type indicated via the indication of the QCL type, as may have been received in or with the reference signal from the base station 105-*b*, for example, at 310.

At 320, the UE 115-*c* may transmit to the UE 115-*d*, and the UE 115-*d* may receive from the UE 115-*c*, one or more QCL parameters, which the UE 115-*c* may have determined at 315.

At 325, the UE 115-*d* may identify one or more QCL parameters of the QCL parameters, as the UE 115-*d* may have received from the UE 115-*c* via the sidelink channel at 320.

At 330, the UE 115-*d* may communicate with the UE 115-*c* via the sidelink channel, for example, based on the QCL parameters, or the data information or control information. In some implementations, the communications between the UE 115-*d* and the UE 115-*c* may include unicasting, broadcasting, or multicasting information (such as data or control information) via the sidelink channel. Additionally or alternatively to communicating with the UE 115-*c*, at 335, the UE 115-*d* may communicate with the base station 105-*b*. In some implementations, the communications between the UE 115-*d* and the base station 105-*b* may include unicasting, broadcasting, or multicasting uplink or downlink transmissions (such as data or control information) via an access link, for example, as described with reference to FIG. 2.

Figure 4:
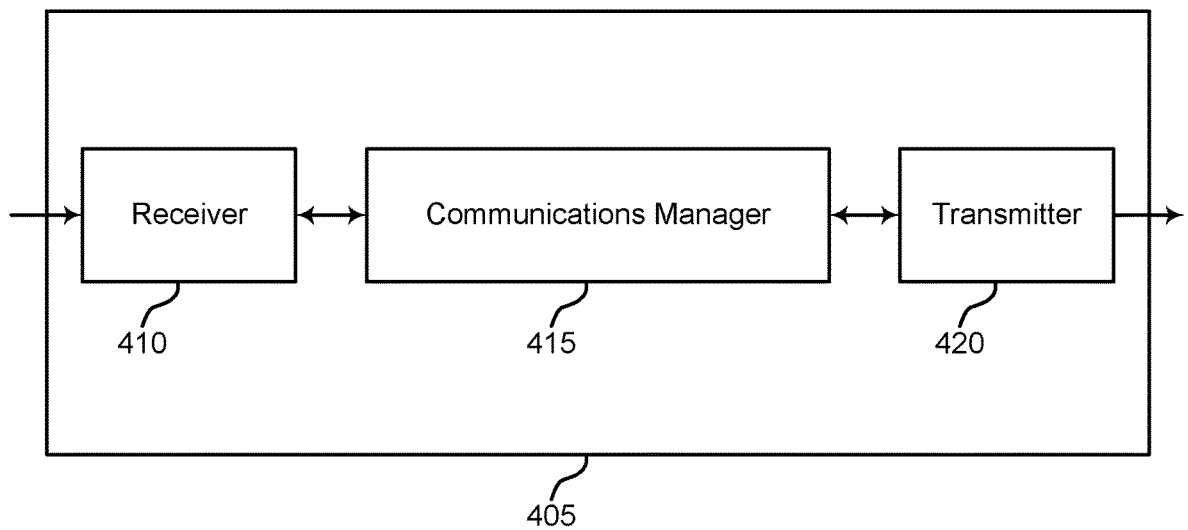
FIGS. 4 and 5 show block diagrams of devices that support beam configurations for multicast and broadcast communications in accordance with aspects of the present disclosure.

FIG. 4 shows a block diagram of a device 405 that supports beam configurations for multicast and broadcast communications in accordance with aspects of the present disclosure. The device 405 may be an example of aspects of a UE 115. The device 405 may include a receiver 410, a communications manager 415, and a transmitter 420. The communications manager 415 can be implemented, at least in part, by one or both of a modem and a processor. Each of these components may be in communication with one another (such as via one or more buses).

The receiver 410 may receive information such as packets, user data, or control information associated with various information channels (such as control channels, data channels, and information related to beam configurations for multicast and broadcast communications, among other examples). The receiver 410 may pass the information on to other components of the device 405. The receiver 410 may be an example of aspects of the transceiver 720 as described with reference to FIG. 7. The receiver 410 may utilize a set of antennas.

The communications manager 415 may receive, from a base station, a configuration message indicating QCL information associated with one or more of the first UE and a second UE; determine, based on the QCL information in the configuration message, one or more QCL parameters associated with the second UE; transmit, to the second UE via a sidelink channel, the one or more QCL parameters associated with the second UE; and communicate, with the second UE, via the sidelink channel and based on the one or more QCL parameters, one or more of data information or control information. The communications manager 415 may also receive, from a second UE via a sidelink channel or from a base station, one or more QCL parameters; identify at least one QCL parameter of the one or more QCL parameters received from the second UE or from the base station; and communicate with the second UE via the sidelink channel based on the at least one QCL parameter.

The actions performed by the communications manager 415 as described herein may be implemented to realize one or more potential advantages discussed herein. In various implementations, UEs may utilize QCL information to configure beams for communication links, such as sidelinks between the UEs, that the UEs may use for communications with one another and communication links that the UEs may use for communications with the base station. By using the QCL information, the UEs may relatively improve communication reliability and link quality between communication devices, for example, for uplink, downlink, and sidelink communications, among other benefits.

The transmitter 420 may transmit signals generated by other components of the device 405. In some examples, the transmitter 420 may be collocated with a receiver 410 in a transceiver component. For example, the transmitter 420 may be an example of aspects of the transceiver 720 as described with reference to FIG. 7. The transmitter 420 may utilize a set of antennas.

Figure 5:
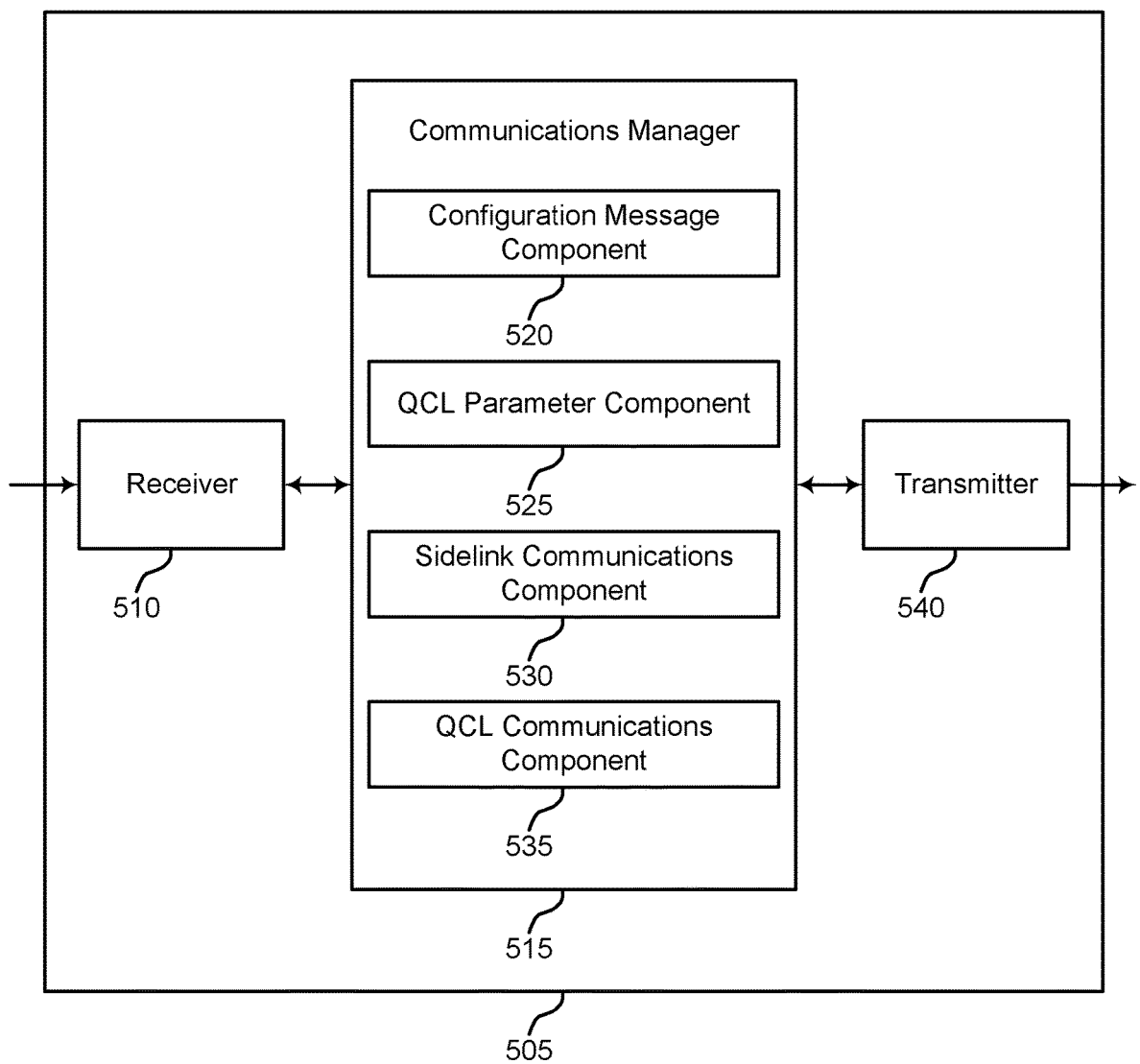

FIG. 5 shows a block diagram of a device 505 that supports beam configurations for multicast and broadcast communications in accordance with aspects of the present disclosure. The device 505 may be an example of aspects of a device 405, or a UE 115. The device 505 may include a receiver 510, a communications manager 515, and a transmitter 540. The communications manager 515 can be implemented, at least in part, by one or both of a modem and a processor. Each of these components may be in communication with one another (such as via one or more buses).

The receiver 510 may receive information such as packets, user data, or control information associated with various information channels (such as control channels, data channels, and information related to beam configurations for multicast and broadcast communications, among other examples). The receiver 510 may pass the information on to other components of the device 505. The receiver 510 may be an example of aspects of the transceiver 720 as described with reference to FIG. 7. The receiver 510 may utilize a set of antennas.

The communications manager 515 may include a configuration message manager 520, a QCL parameter manager 525, a sidelink communications manager 530, and a QCL communications manager 535.

The configuration message manager 520 may receive, from a base station, a configuration message indicating QCL information associated with one or more of the first UE and a second UE.

The QCL parameter manager 525 may determine, based on the QCL information in the configuration message, one or more QCL parameters associated with the second UE. The QCL parameter manager 525 may identify at least one QCL parameter of the one or more QCL parameters received from the second UE or from the base station.

The sidelink communications manager 530 may transmit, to the second UE via a sidelink channel, the one or more QCL parameters associated with the second UE and communicate, via the sidelink channel and based on the one or more QCL parameters, one or more of data information or control information. The sidelink communications manager 530 may receive, from the second UE via a sidelink channel or from a base station, one or more QCL parameters.

The QCL communications manager 535 may communicate with the second UE via the sidelink channel based on the at least one QCL parameter.

The transmitter 540 may transmit signals generated by other components of the device 505. In some examples, the transmitter 540 may be collocated with a receiver 510 in a transceiver component. For example, the transmitter 540 may be an example of aspects of the transceiver 720 as described with reference to FIG. 7. The transmitter 540 may utilize a set of antennas.

Figure 6:
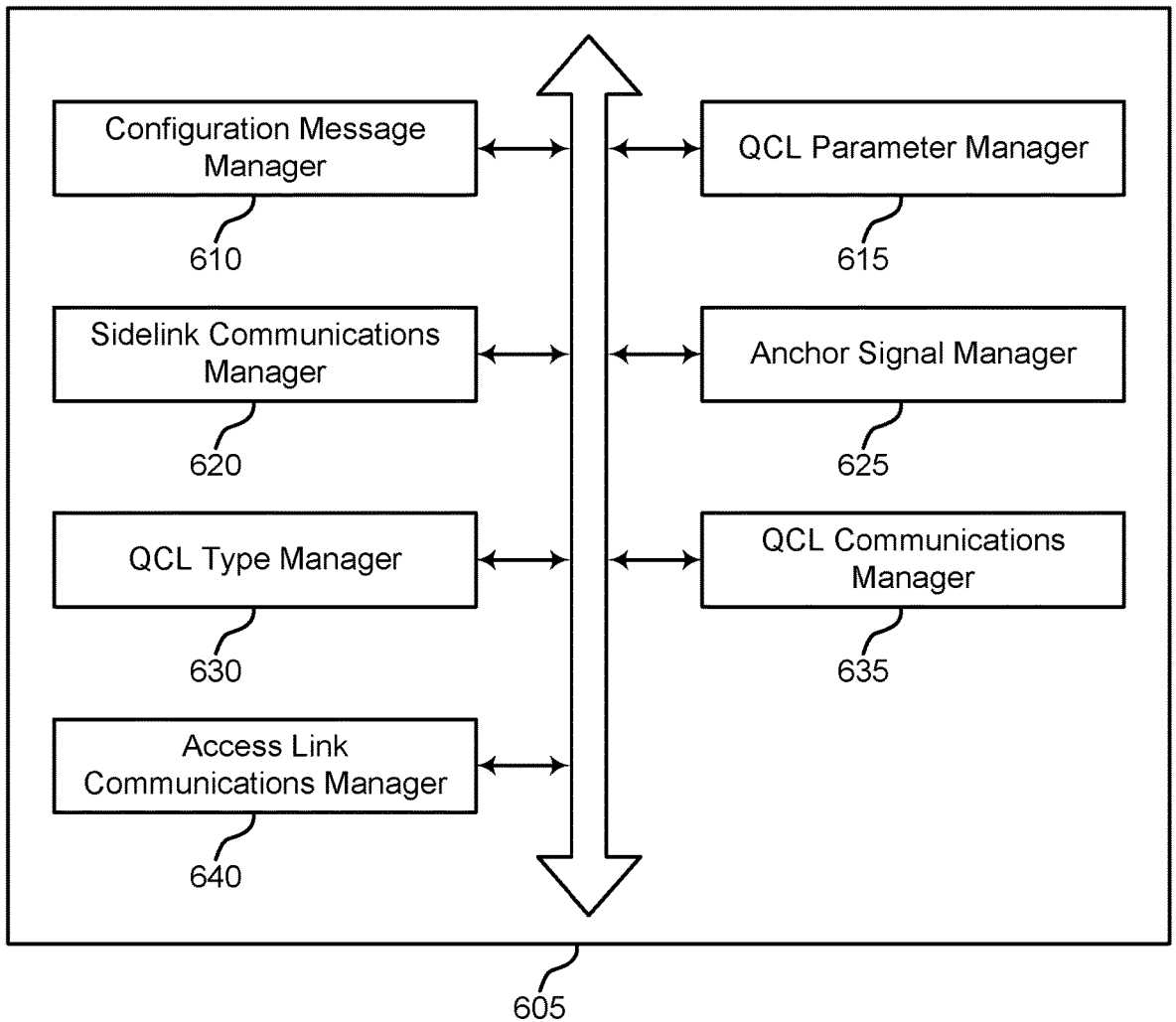
FIG. 6 shows a block diagram of a communications manager that supports beam configurations for multicast and broadcast communications in accordance with aspects of the present disclosure.

FIG. 6 shows a block diagram of a communications manager 605 that supports beam configurations for multicast and broadcast communications in accordance with aspects of the present disclosure. The communications manager 605 may be an example of aspects of a communications manager 415, a communications manager 515, or a communications manager 710. The communications manager 605 may include a configuration message manager 610, a QCL parameter manager 615, a sidelink communications manager 620, an anchor signal manager 625, a QCL type manager 630, a QCL communications manager 635, and an access link communications manager 640. Each of these managers may communicate, directly or indirectly, with one another (such as via one or more buses).

The configuration message manager 610 may receive, from a base station, a configuration message indicating QCL information associated with one or more of the first UE and a second UE. In some examples, the configuration message manager 610 may receive a second configuration message indicating additional QCL information associated with one or more of the first UE or the second UE, where the configuration message and the second configuration message are received from different base stations in different cells or from different TRPs. In some other examples, the configuration message manager 610 may receive a second configuration message indicating additional QCL information associated with one or more of the first UE or the second UE, where the configuration message and the second configuration message are received from one or more devices in a same cell.

In some examples, the configuration message manager 610 may receive one or more fields indicating one or more QCL parameter types, one or more QCL transmission types, one or more cell identifiers identifying a device associated with the configuration message, one or more virtual cell identifiers identifying a device associated with the configuration message, or any combination thereof. In some examples, the configuration message manager 610 may receive the configuration message in one or more of an SSB, RRC message, MAC CE, a CSI-RS, a PRACH, or a DMRS. In some other examples, the configuration message manager 610 may receive the configuration message in an RRC message that includes one or more indices related to an SSB, RRC message, MAC CE, a CSI-RS, a PRACH, or a DMRS. In some examples, the QCL information includes one or more of a Doppler shift, a Doppler spread, an average delay, or a delay spread.

The QCL parameter manager 615 may determine, based on the QCL information in the configuration message, one or more QCL parameters associated with the second UE. In some examples, the QCL parameter manager 615 may identify at least one QCL parameter of the one or more QCL parameters received from the second UE or from the base station.

In some examples, the QCL parameter manager 615 may determine one or more uplink QCL parameters for communication based on a downlink QCL signal. In some examples, the QCL parameter manager 615 may determine one or more downlink QCL parameters for communication based on an uplink QCL signal. In some examples, the QCL parameter manager 615 may determine one or more QCL parameters based on one or more of information in the anchor signal, a signal strength of the anchor signal, or an autonomous operation by the first UE.

In some examples, the one or more QCL parameters include one or more of downlink QCL parameters, uplink QCL parameters, or sidelink QCL parameters. In some examples, the one or more QCL parameters include one or more channel-specific QCL parameters. In some examples, the one or more QCL parameters include one or more signal-specific QCL parameters. In some examples, the one or more QCL parameters include one or more of a resource allocation, a spatial relationship, a spatial filter, or a power control parameter.

In some cases, the actions performed by the QCL parameter manager 615, included in the communications manager 605, as described herein may facilitate the processor 740, as described with reference to FIG. 7, to more efficiently cause the device to perform various functions. For example, UEs may utilize QCL information to configure beams for communication links, such as sidelinks between the UEs, that the UEs may use for communications with one another and communication links that the UEs may use for communications with the base station. By using the QCL information, the UEs may relatively improve communication reliability and link quality between communication devices, for example, for uplink, downlink, and sidelink communications, among other benefits. Through the improved communications by way of utilizing QCL information, devices such as UEs may conserve spectral resources, which may further reduce processing complexity for the processor of the device and processing power consumption for the processor.

The sidelink communications manager 620 may transmit, to the second UE via a sidelink channel, the one or more QCL parameters associated with the second UE. In some examples, the sidelink communications manager 620 may communicate, with the second UE, via the sidelink channel and based on the one or more QCL parameters, one or more of data information or control information. In some examples, the sidelink communications manager 620 may receive, from the second UE via a sidelink channel or from a base station, one or more QCL parameters. In some examples, the sidelink communications manager 620 may unicast, broadcast, or multicast to the second UE via the sidelink channel.

The anchor signal manager 625 may receive, from the base station, an anchor signal, where the one or more QCL parameters are determined based on the anchor signal.

The QCL type manager 630 may determine one or more QCL parameters based on a QCL type.

In some examples, the QCL type manager 630 may receive a reference signal including an indication of the QCL type.

The QCL communications manager 635 may communicate with the second UE via the sidelink channel based on the at least one QCL parameter.

The access link communications manager 640 may receive, from the base station based on the one or more QCL parameters, a downlink transmission including one or more of data information or control information.

In some examples, the access link communications manager 640 may transmit, to the base station based on the one or more QCL parameters, an uplink transmission including one or more of data information or control information.

Figure 7:
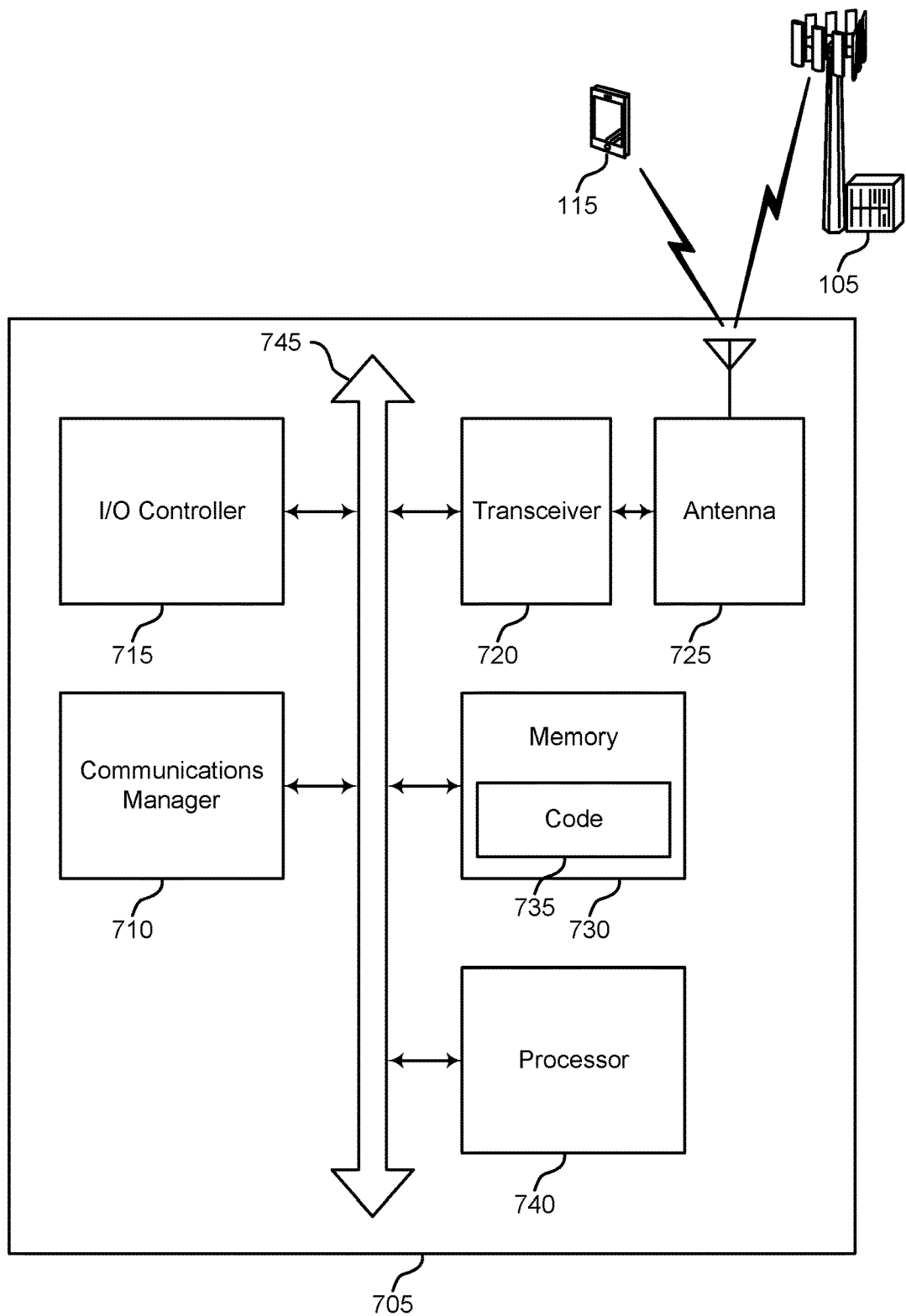
FIG. 7 shows a diagram of a system including a device that supports beam configurations for multicast and broadcast communications in accordance with aspects of the present disclosure.

FIG. 7 shows a diagram of a system including a device 705 that supports beam configurations for multicast and broadcast communications in accordance with aspects of the present disclosure. The device 705 may be an example of or include the components of device 405, device 505, or a UE 115. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (such as bus 745).

The communications manager 710 may receive, from a base station, a configuration message indicating QCL information associated with one or more of the first UE and a second UE; determine, based on the QCL information in the configuration message, one or more QCL parameters associated with the second UE; transmit, to the second UE via a sidelink channel, the one or more QCL parameters associated with the second UE; and communicate, with the second UE, via the sidelink channel and based on the one or more QCL parameters, one or more of data information or control information. The communications manager 710 may also receive; from the second UE via a sidelink channel or from a base station, one or more QCL parameters; identify at least one QCL parameter of the one or more QCL parameters received from the second UE or from the base station; and communicate with the second UE via the sidelink channel based on the at least one QCL parameter.

The I/O controller 715 may manage input and output signals for the device 705. The I/O controller 715 may also manage peripherals not integrated into the device 705. In some examples, the I/O controller 715 may represent a physical connection or port to an external peripheral. In some examples, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some examples, the I/O controller 715 may be implemented as part of a processor. In some examples, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also be connected to or include a modem to modulate the packets and provide the modulated packets to the antennas for transmission, and to demodulate packets received from the antennas.

In some examples, the wireless device may include a single antenna 725. However, in some examples, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some examples, the memory 730 may contain, among other things, a Basic Input/Output System (BIOS), which may control basic hardware or software operation such as the interaction with peripheral components or devices.

The processor 740 may include an intelligent hardware device, (such as a general-purpose processor, a digital signal processor (DSP), a central processing unit (CPU), a microcontroller, an ASIC, an FPGA, a programmable logic device, a discrete gate or transistor logic component, a discrete hardware component, or any combination thereof). In some examples, the processor 740 may be configured to operate a memory array using a memory controller. In other cases, a memory controller may be integrated into the processor 740. The processor 740 may be configured to execute computer-readable instructions stored in a memory (such as the memory 730) to cause the device 705 to perform various functions (such as functions or tasks supporting beam configurations for multicast and broadcast communications).

The code 735 may include instructions to implement aspects of the present disclosure, including instructions to support wireless communications. The code 735 may be stored in a non-transitory computer-readable medium such as system memory or other type of memory. In some examples, the code 735 may not be directly executable by the processor 740 but may cause a computer (such as when compiled and executed) to perform functions described herein.

Figure 8:
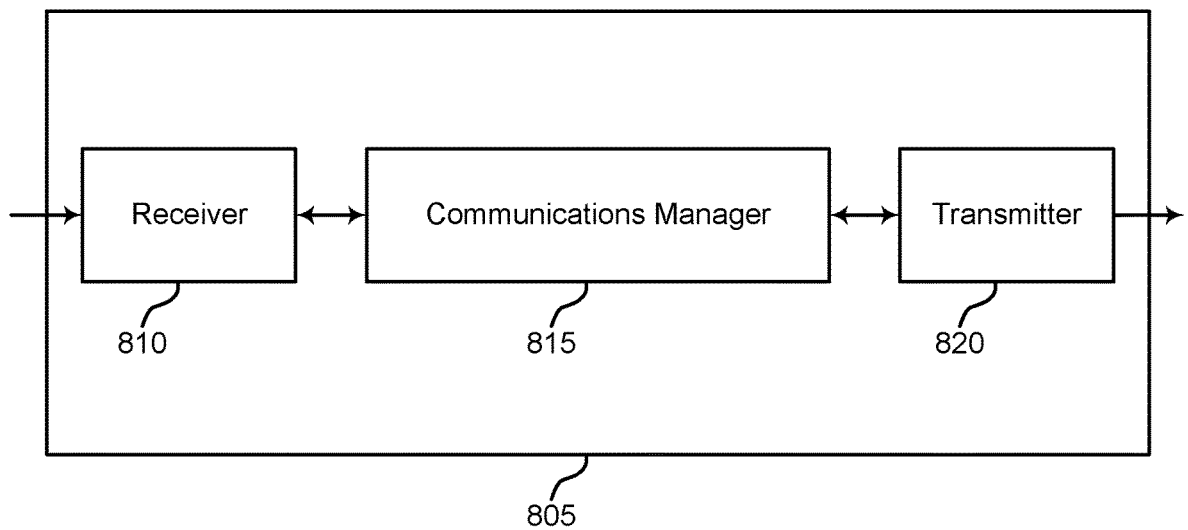
FIGS. 8 and 9 show block diagrams of devices that support beam configurations for multicast and broadcast communications in accordance with aspects of the present disclosure.

FIG. 8 shows a block diagram of a device 805 that supports beam configurations for multicast and broadcast communications in accordance with aspects of the present disclosure. The device 805 may be an example of aspects of a base station 105. The device 805 may include a receiver 810, a communications manager 815, and a transmitter 820. The communications manager 815 can be implemented, at least in part, by one or both of a modem and a processor. Each of these components may be in communication with one another (such as via one or more buses).

The receiver 810 may receive information such as packets, user data, or control information associated with various information channels (such as control channels, data channels, and information related to beam configurations for multicast and broadcast communications, among other examples). The receiver 810 may pass the information on to other components of the device 805. The receiver 810 may be an example of aspects of the transceiver 1120 as described with reference to FIG. 11. The receiver 810 may utilize a set of antennas.

The communications manager 815 may determine QCL information associated with a first UE and a second UE, transmit, to the first UE, a configuration message including the QCL information, and communicate, with the second UE, based on transmitting the configuration message including the QCL information to the first UE.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 as described with reference to FIG. 11. The transmitter 820 may utilize a set of antennas.

Figure 9:
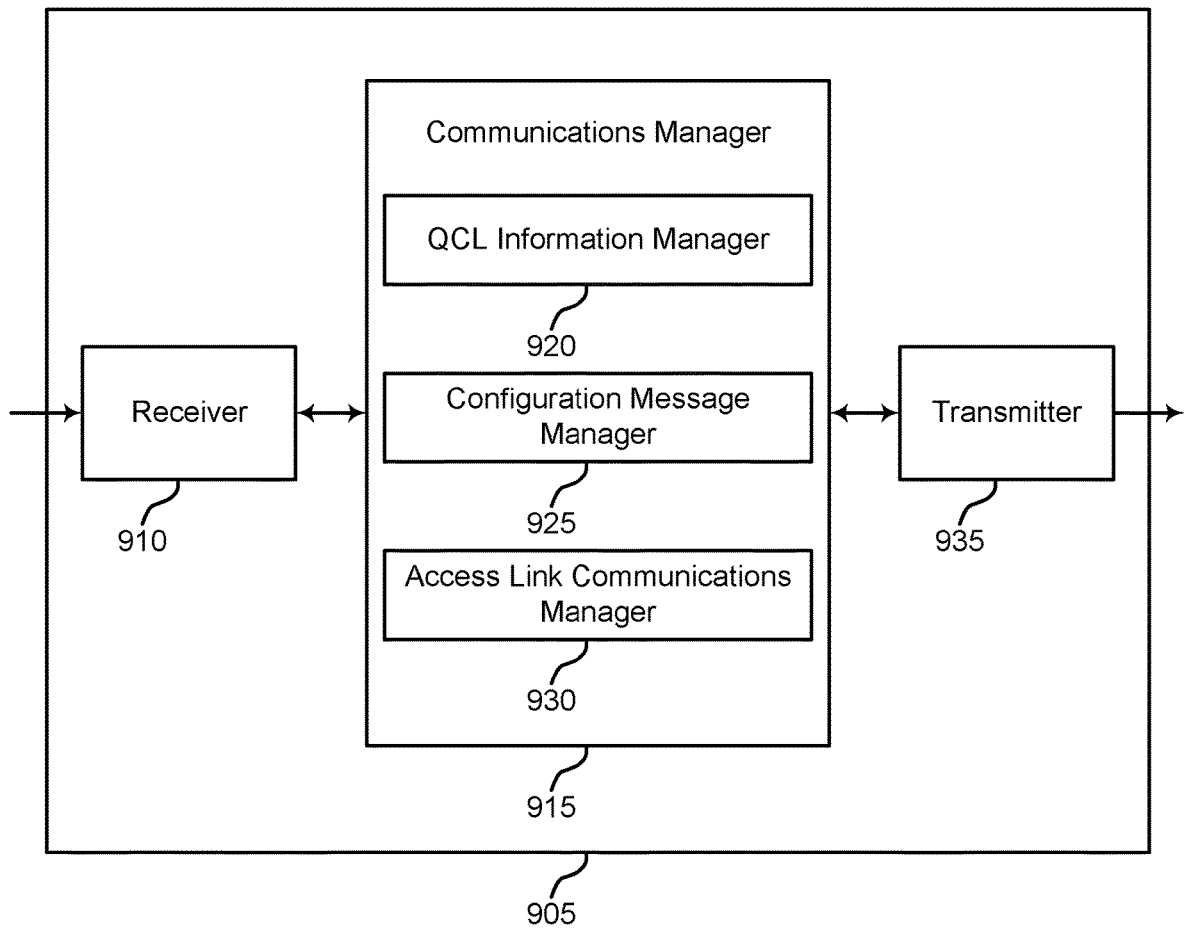

FIG. 9 shows a block diagram of a device 905 that supports beam configurations for multicast and broadcast communications in accordance with aspects of the present disclosure. The device 905 may be an example of aspects of a device 805, or a base station 105. The device 905 may include a receiver 910, a communications manager 915, and a transmitter 935. The communications manager 915 can be implemented, at least in part, by one or both of a modem and a processor. Each of these components may be in communication with one another (such as via one or more buses).

The receiver 910 may receive information such as packets, user data, or control information associated with various information channels (such as control channels, data channels, and information related to beam configurations for multicast and broadcast communications, among other examples). The receiver 910 may pass the information on to other components of the device 905. The receiver 910 may be an example of aspects of the transceiver 1120 as described with reference to FIG. 11. The receiver 910 may utilize a set of antennas.

The communications manager 915 may include a QCL information manager 920, a configuration message manager 925, and an access link communications manager 930.

The QCL information manager 920 may determine QCL information associated with a first UE and a second UE.

The configuration message manager 925 may transmit, to the first UE, a configuration message including the QCL information.

The access link communications manager 930 may communicate, with the second UE, based on transmitting the configuration message including the QCL information to the first UE.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 as described with reference to FIG. 11. The transmitter 935 may utilize a set of antennas.

Figure 10:
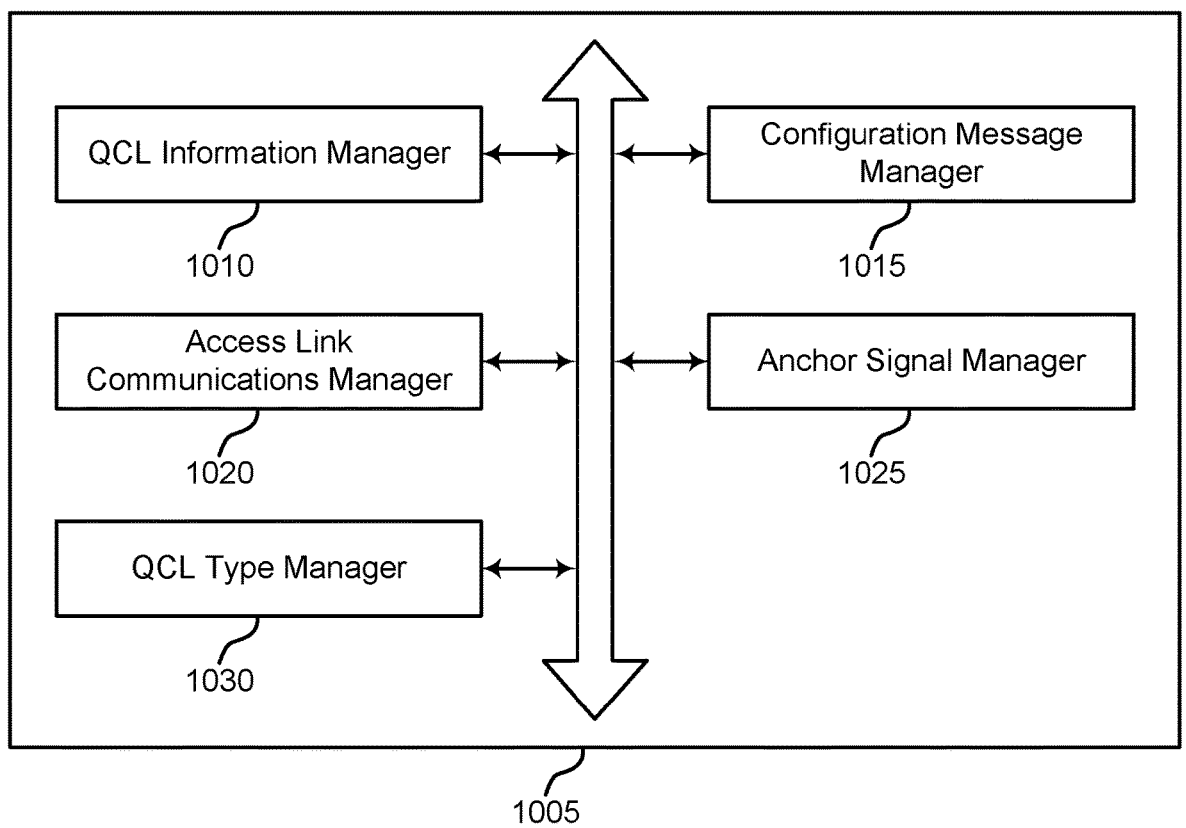
FIG. 10 shows a block diagram of a communications manager that supports beam configurations for multicast and broadcast communications in accordance with aspects of the present disclosure.

FIG. 10 shows a block diagram of a communications manager 1005 that supports beam configurations for multicast and broadcast communications in accordance with aspects of the present disclosure. The communications manager 1005 may be an example of aspects of a communications manager 815, a communications manager 915, or a communications manager 1110. The communications manager 1005 may include a QCL information manager 1010, a configuration message manager 1015, an access link communications manager 1020, an anchor signal manager 1025, and a QCL type manager 1030. Each of these managers may communicate, directly or indirectly, with one another (such as via one or more buses).

The QCL information manager 1010 may determine QCL information associated with a first UE and a second UE. In some examples, the QCL information includes QCL information specific to one or more corresponding channels. In some examples, the QCL information includes QCL information specific to one or more corresponding signals. In some examples, the QCL information includes one or more of QCL information indicative of a resource allocation, a spatial relationship, a spatial filter, or a power control parameter. In some examples, the QCL information includes one or more of a Doppler shift, a Doppler spread, an average delay, or a delay spread.

The configuration message manager 1015 may transmit, to the first UE, a configuration message including the QCL information. In some examples, the configuration message manager 1015 may transmit QCL information to the first UE indicating how the second UE may communicate with the base station. In some examples, the configuration message manager 1015 may transmit the configuration message in one or more of an SSB, RRC message, MAC CE, DCI, CSI-RS, a PRACH, or a DMRS.

The access link communications manager 1020 may communicate, with the second UE, based on transmitting the configuration message including the QCL information to the first UE. In some examples, the access link communications manager 1020 may communicate, to the second UE based on the QCL information, one or more of data information or control information.

The anchor signal manager 1025 may transmit, to the first UE, an anchor signal, where communicating with the second UE is based on the anchor signal. In some examples, the anchor signal manager 1025 may communicate with the second UE based on information in the anchor signal or a signal strength of the anchor signal.

The QCL type manager 1030 may determine QCL information based on a QCL type. In some examples, the QCL type manager 1030 may transmit, to the first UE, a reference signal including an indication of the QCL type.

Figure 11:
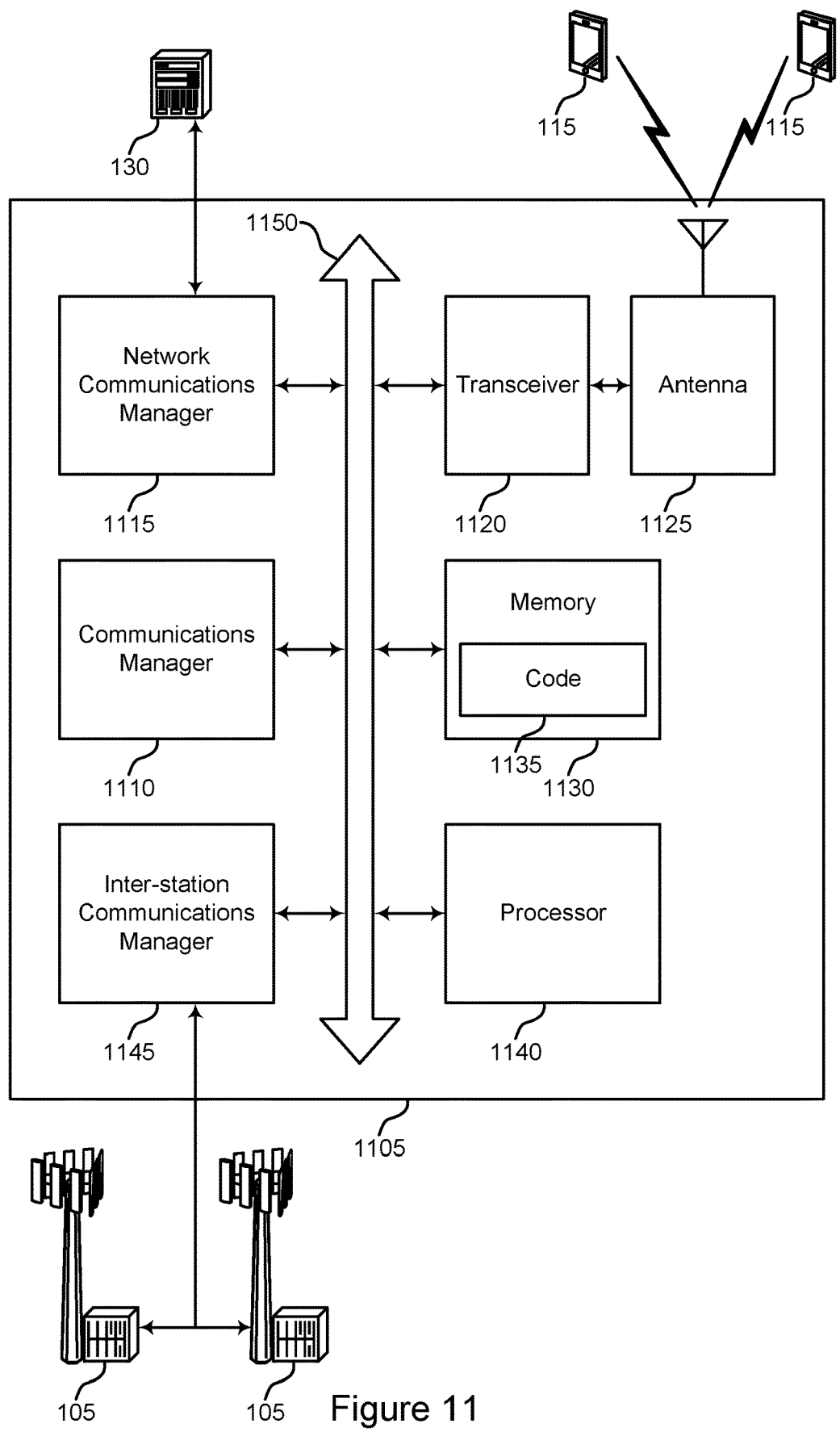
FIG. 11 shows a diagram of a system including a device that supports beam configurations for multicast and broadcast communications in accordance with aspects of the present disclosure.

FIG. 11 shows a diagram of a system including a device 1105 that supports beam configurations for multicast and broadcast communications in accordance with aspects of the present disclosure. The device 1105 may be an example of or include the components of device 805, device 905, or a base station 105. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (such as bus 1150).

The communications manager 1110 may determine QCL information associated with a first UE and a second UE, transmit, to the first UE, a configuration message including the QCL information, and communicate, with the second UE, based on transmitting the configuration message including the QCL information to the first UE.

The network communications manager 1115 may manage communications with the core network (such as via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also be connected to or include a modem to modulate the packets and provide the modulated packets to the antennas for transmission, and to demodulate packets received from the antennas.

In some examples, the wireless device may include a single antenna 1125. However, in some examples, the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (such as the processor 1140) cause the device to perform various functions described herein. In some examples, the memory 1130 may contain, among other things, a BIOS, which may control basic hardware or software operation such as the interaction with peripheral components or devices.

The processor 1140 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In some examples, a memory controller may be integrated into processor 1140. The processor 1140 may be configured to execute computer-readable instructions stored in a memory (such as the memory 1130) to cause the device 1105 to perform various functions (such as functions or tasks supporting beam configurations for multicast and broadcast communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some examples, the code 1135 may not be directly executable by the processor 1140 but may cause a computer (such as when compiled and executed) to perform functions described herein.

Figure 12:
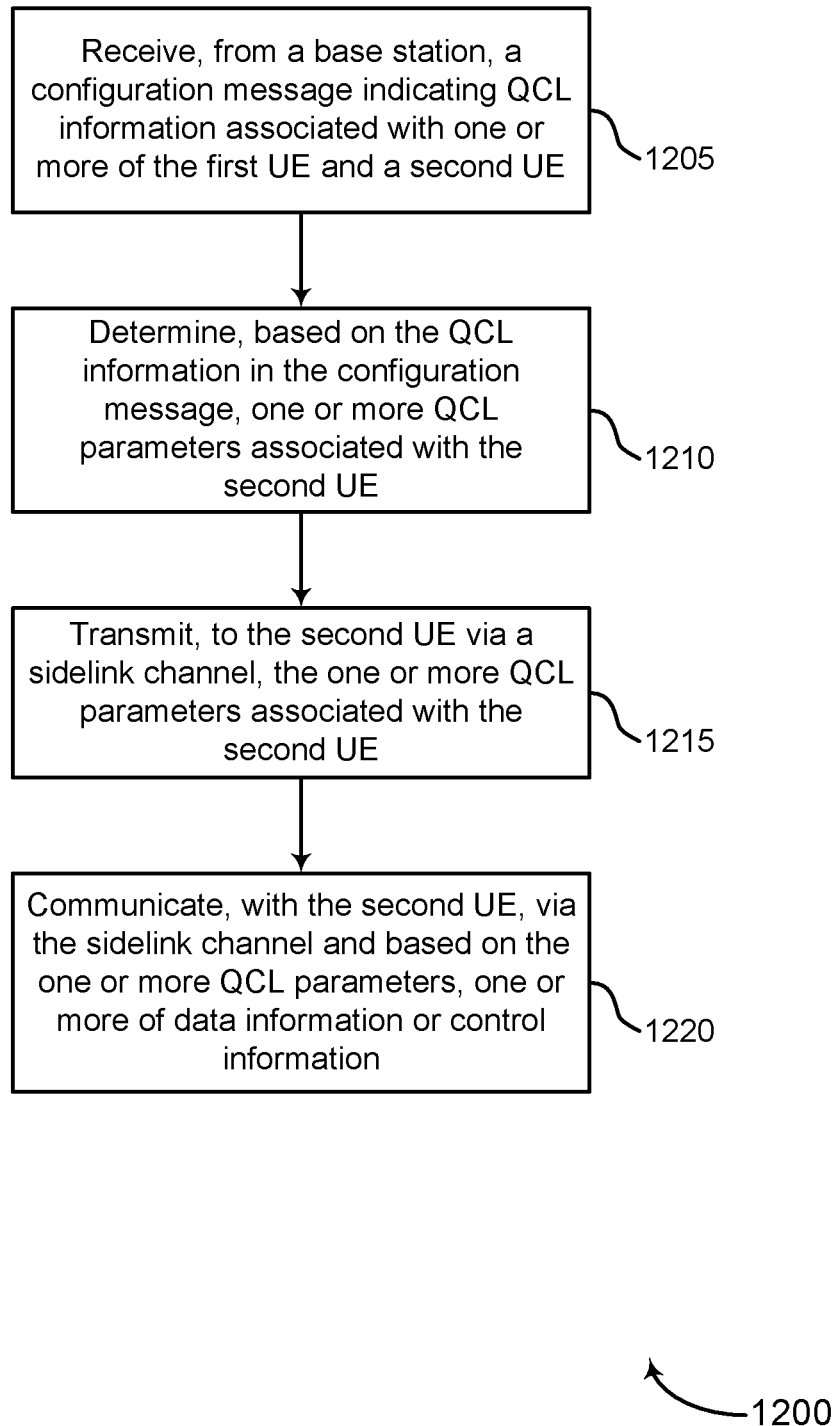
FIGS. 12 through 16 show flowcharts illustrating methods that support beam configurations for multicast and broadcast communications in accordance with aspects of the present disclosure.

FIG. 12 shows a flowchart illustrating a method 1200 that supports beam configurations for multicast and broadcast communications in accordance with aspects of the present disclosure. The operations of method 1200 may be implemented by a UE 115 or its components. For example, the operations of method 1200 may be performed by a communications manager as described with reference to FIGS. 4-7. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, a configuration message indicating QCL information associated with one or more of the first UE and a second UE. The operations of 1205 may be performed according to the methods described herein. In some examples, aspects of the operations of 1205 may be performed by a configuration message manager as described with reference to FIGS. 4-7.

At 1210, the UE may determine, based on the QCL information in the configuration message, one or more QCL parameters associated with the second UE. The operations of 1210 may be performed according to the methods described herein. In some examples, aspects of the operations of 1210 may be performed by a QCL parameter manager as described with reference to FIGS. 4-7.

At 1215, the UE may transmit, to the second UE via a sidelink channel, the one or more QCL parameters associated with the second UE. The operations of 1215 may be performed according to the methods described herein. In some examples, aspects of the operations of 1215 may be performed by a sidelink communications manager as described with reference to FIGS. 4-7.

At 1220, the UE may communicate, with the second UE, via the sidelink channel and based on the one or more QCL parameters, one or more of data information or control information. The operations of 1220 may be performed according to the methods described herein. In some examples, aspects of the operations of 1220 may be performed by a sidelink communications manager as described with reference to FIGS. 4-7.

Figure 13:
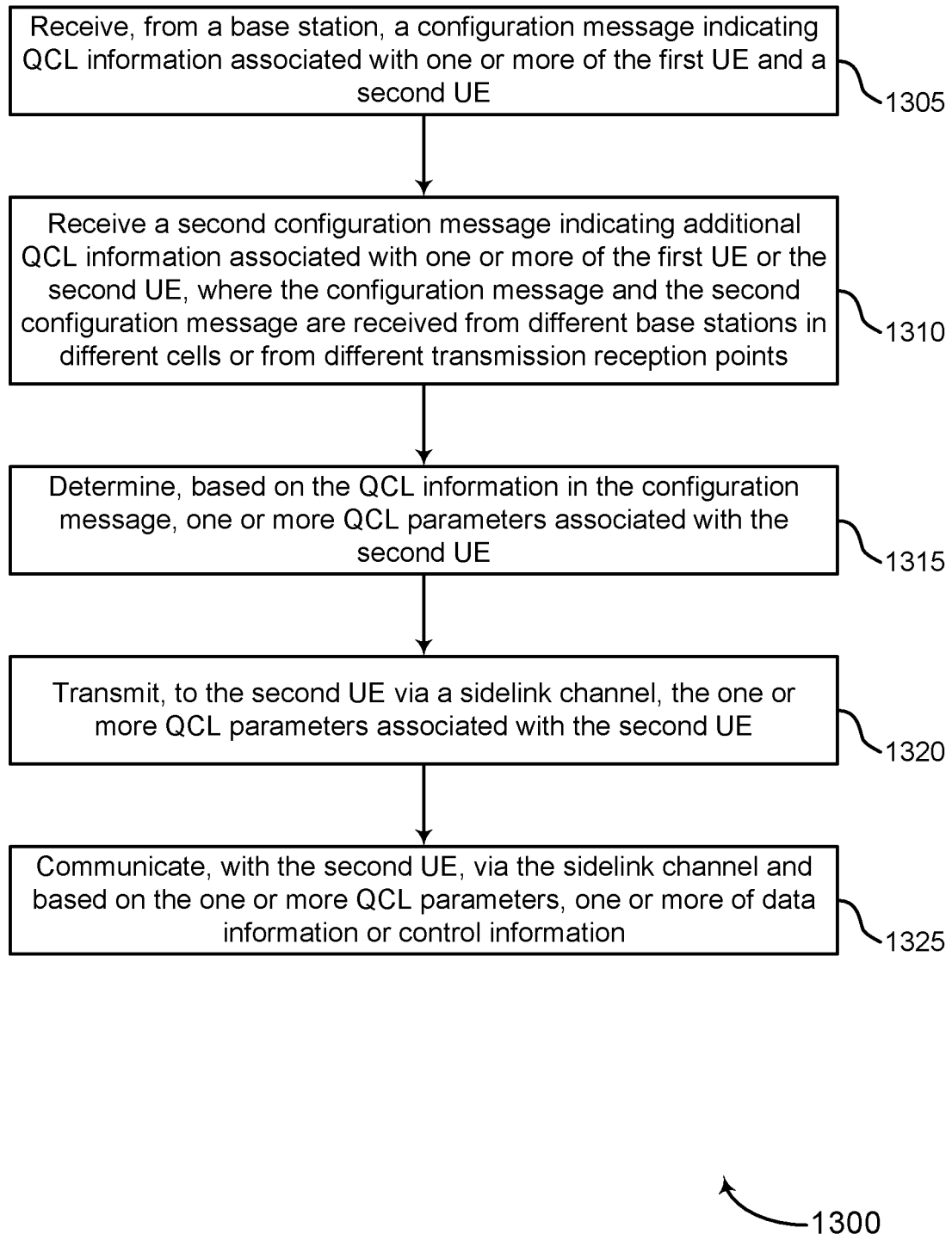

FIG. 13 shows a flowchart illustrating a method 1300 that supports beam configurations for multicast and broadcast communications in accordance with aspects of the present disclosure. The operations of method 1300 may be implemented by a UE 115 or its components. For example, the operations of method 1300 may be performed by a communications manager as described with reference to FIGS. 4-7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a configuration message indicating QCL information associated with one or more of the first UE and a second UE. The operations of 1305 may be performed according to the methods described herein. In some examples, aspects of the operations of 1305 may be performed by a configuration message manager as described with reference to FIGS. 4-7.

At 1310, the UE may receive a second configuration message indicating additional QCL information associated with one or more of the first UE or the second UE, where the configuration message and the second configuration message are received from different base stations in different cells or from different TRPs. The operations of 1310 may be performed according to the methods described herein. In some examples, aspects of the operations of 1310 may be performed by a configuration message manager as described with reference to FIGS. 4-7.

At 1315, the UE may determine, based on the QCL information in the configuration message, one or more QCL parameters associated with the second UE. The operations of 1315 may be performed according to the methods described herein. In some examples, aspects of the operations of 1315 may be performed by a QCL parameter manager as described with reference to FIGS. 4-7.

At 1320, the UE may transmit, to the second UE via a sidelink channel, the one or more QCL parameters associated with the second UE. The operations of 1320 may be performed according to the methods described herein. In some examples, aspects of the operations of 1320 may be performed by a sidelink communications manager as described with reference to FIGS. 4-7.

At 1325, the UE may communicate, with the second UE, via the sidelink channel and based on the one or more QCL parameters, one or more of data information or control information. The operations of 1325 may be performed according to the methods described herein. In some examples, aspects of the operations of 1325 may be performed by a sidelink communications manager as described with reference to FIGS. 4-7.

Figure 14:
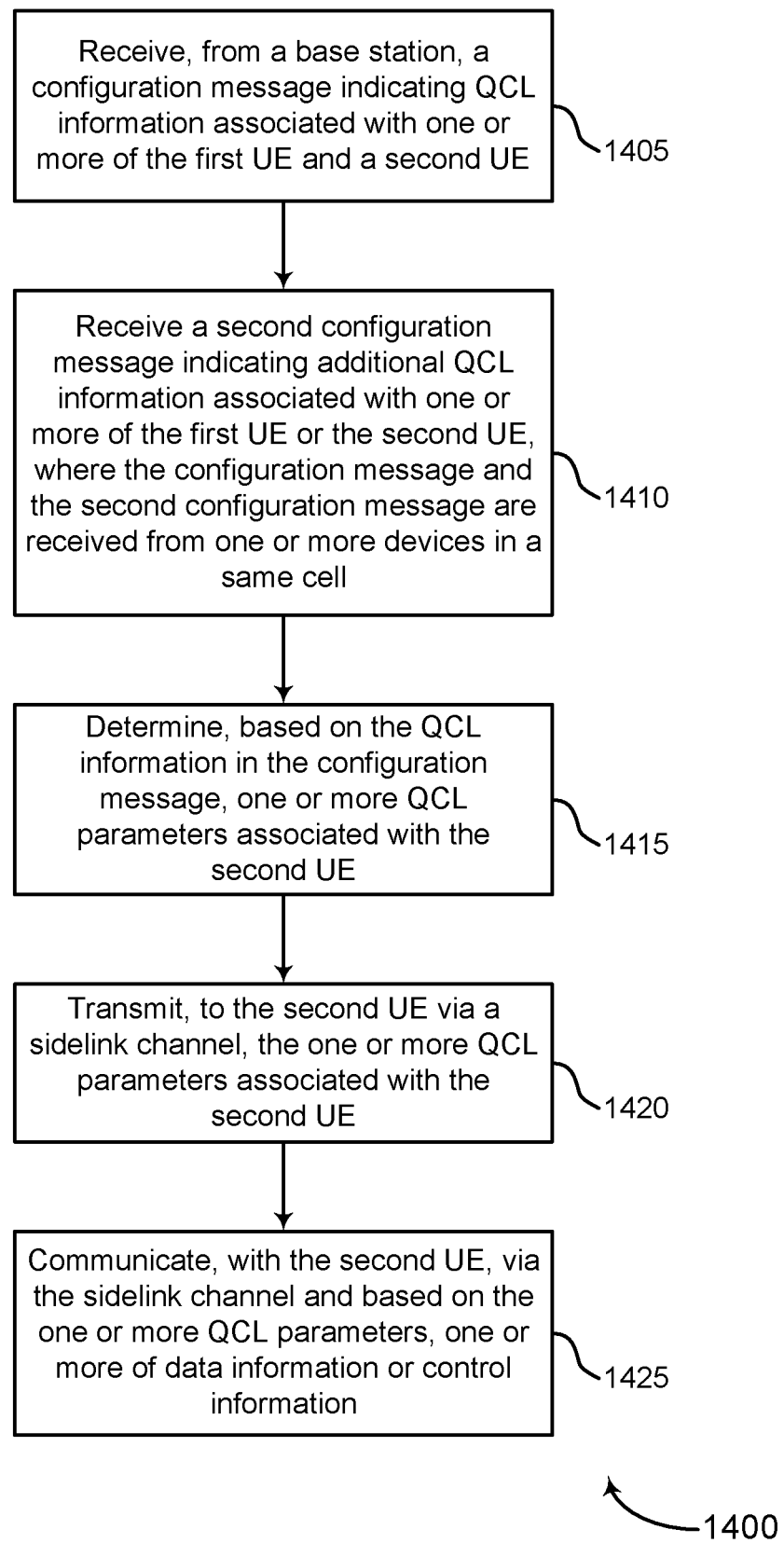

FIG. 14 shows a flowchart illustrating a method 1400 that supports beam configurations for multicast and broadcast communications in accordance with aspects of the present disclosure. The operations of method 1400 may be implemented by a UE 115 or its components. For example, the operations of method 1400 may be performed by a communications manager as described with reference to FIGS. 4-7. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration message indicating QCL information associated with one or more of the first UE and a second UE. The operations of 1405 may be performed according to the methods described herein. In some examples, aspects of the operations of 1405 may be performed by a configuration message manager as described with reference to FIGS. 4-7.

At 1410, the UE may receive a second configuration message indicating additional QCL information associated with one or more of the first UE or the second UE, where the configuration message and the second configuration message are received from one or more devices in a same cell. The operations of 1410 may be performed according to the methods described herein. In some examples, aspects of the operations of 1410 may be performed by a configuration message manager as described with reference to FIGS. 4-7.

At 1415, the UE may determine, based on the QCL information in the configuration message, one or more QCL parameters associated with the second UE. The operations of 1415 may be performed according to the methods described herein. In some examples, aspects of the operations of 1415 may be performed by a QCL parameter manager as described with reference to FIGS. 4-7.

At 1420, the UE may transmit, to the second UE via a sidelink channel, the one or more QCL parameters associated with the second UE. The operations of 1420 may be performed according to the methods described herein. In some examples, aspects of the operations of 1420 may be performed by a sidelink communications manager as described with reference to FIGS. 4-7.

At 1425, the UE may communicate, with the second UE, via the sidelink channel and based on the one or more QCL parameters, one or more of data information or control information. The operations of 1425 may be performed according to the methods described herein. In some examples, aspects of the operations of 1425 may be performed by a sidelink communications manager as described with reference to FIGS. 4-7.

Figure 15:
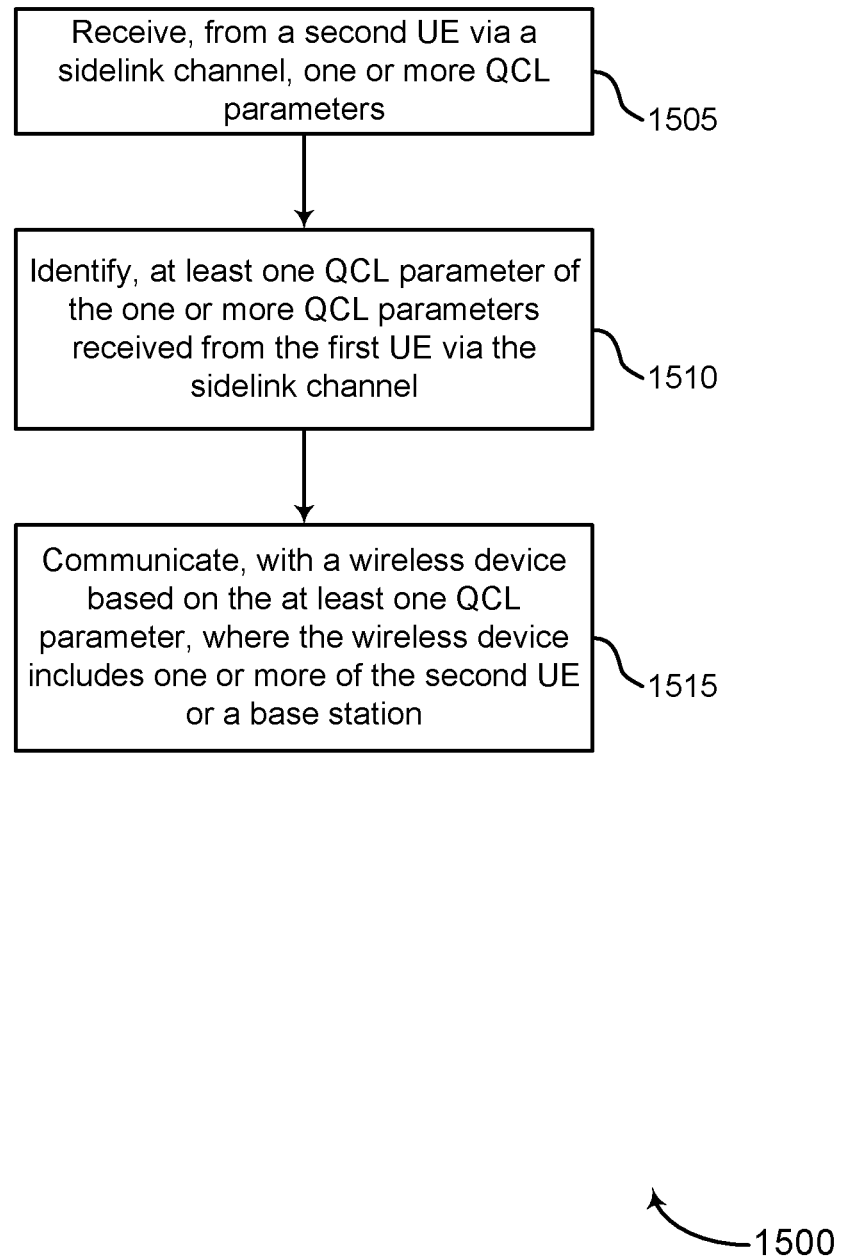

FIG. 15 shows a flowchart illustrating a method 1500 that supports beam configurations for multicast and broadcast communications in accordance with aspects of the present disclosure. The operations of method 1500 may be implemented by a UE 115 or its components. For example, the operations of method 1500 may be performed by a communications manager as described with reference to FIGS. 4-7. In some examples, a UE may execute a set of instructions to control the functional elements of the UE to perform the functions described below. Additionally or alternatively, a UE may perform aspects of the functions described below using special-purpose hardware.

At 1505, the UE may receive, from a second UE via a sidelink channel or from a base station, one or more QCL parameters. The operations of 1505 may be performed according to the methods described herein. In some examples, aspects of the operations of 1505 may be performed by a sidelink communications manager as described with reference to FIGS. 4-7.

At 1510, the UE may identify at least one QCL parameter of the one or more QCL parameters received from the second UE or from the base station. The operations of 1510 may be performed according to the methods described herein. In some examples, aspects of the operations of 1510 may be performed by a QCL parameter manager as described with reference to FIGS. 4-7.

At 1515, the UE may communicate with the second UE via the sidelink channel based on the at least one QCL parameter. The operations of 1515 may be performed according to the methods described herein. In some examples, aspects of the operations of 1515 may be performed by a QCL communications manager as described with reference to FIGS. 4-7.

Figure 16:
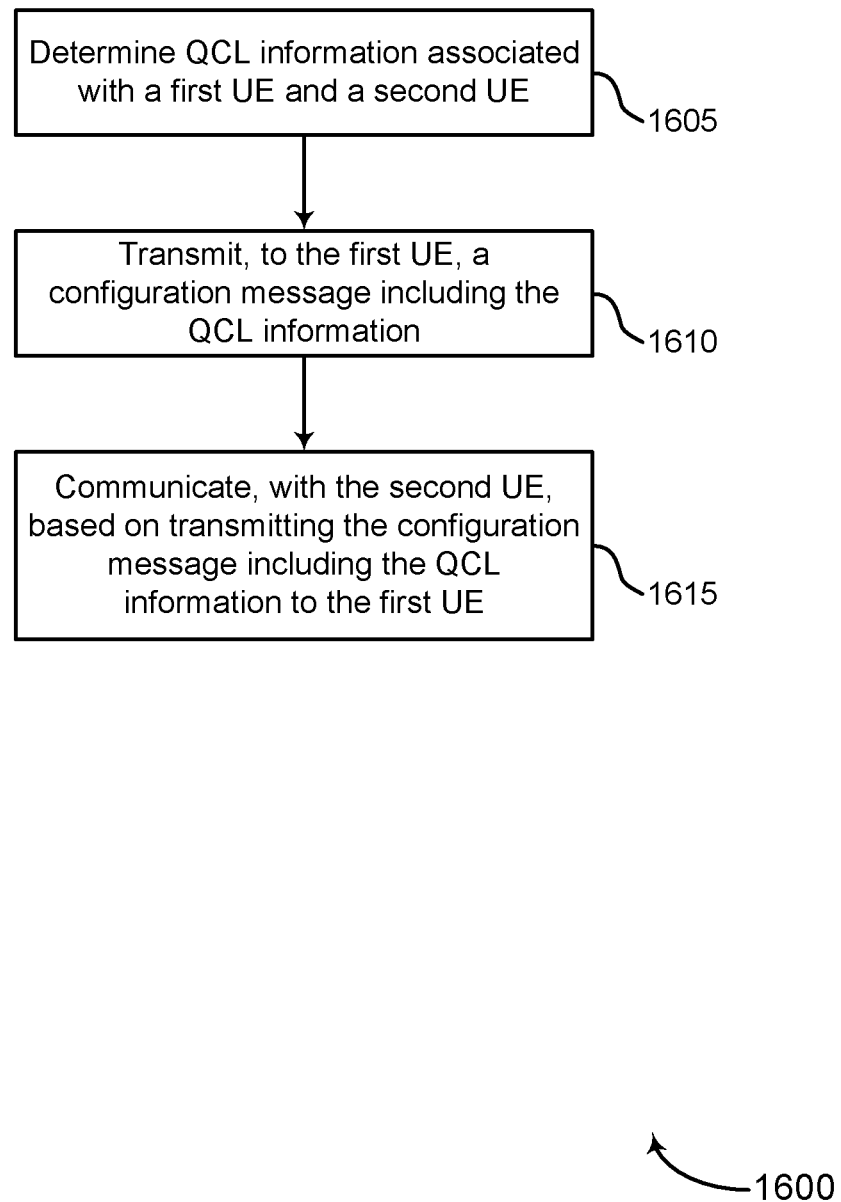

FIG. 16 shows a flowchart illustrating a method 1600 that supports beam configurations for multicast and broadcast communications in accordance with aspects of the present disclosure. The operations of method 1600 may be implemented by a base station 105 or its components. For example, the operations of method 1600 may be performed by a communications manager as described with reference to FIGS. 8-11. In some examples, a base station may execute a set of instructions to control the functional elements of the base station to perform the functions described below. Additionally or alternatively, a base station may perform aspects of the functions described below using special-purpose hardware.

At 1605, the base station may determine QCL information associated with a first UE and a second UE. The operations of 1605 may be performed according to the methods described herein. In some examples, aspects of the operations of 1605 may be performed by a QCL information manager as described with reference to FIGS. 8-11.

At 1610, the base station may transmit, to the first UE, a configuration message including the QCL information. The operations of 1610 may be performed according to the methods described herein. In some examples, aspects of the operations of 1610 may be performed by a configuration message manager as described with reference to FIGS. 8-11.

At 1615, the base station may communicate, with the second UE, based on transmitting the configuration message including the QCL information to the first UE. The operations of 1615 may be performed according to the methods described herein. In some examples, aspects of the operations of 1615 may be performed by an access link communications manager as described with reference to FIGS. 8-11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier FDMA (SC-FDMA), and other systems. A CDMA system may implement a radio technology such as CDMA2000, and Universal Terrestrial Radio Access (UTRA), among other examples. CDMA2000 covers IS-2000, IS-95, and IS-856 standards. IS-2000 Releases may be commonly referred to as 1× or CDMA2000 1×, among other examples. IS-856 (TIA-856) is commonly referred to as CDMA2000 1×EV-DO, or High Rate Packet Data (HRPD), among other examples. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, or Flash-OFDM, among other examples. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (such as several kilometers in radius) and may allow unrestricted access by UEs with service subscriptions with the network provider. A small cell may be associated with a lower-powered base station, as compared with a macro cell, and a small cell may operate in the same or different (such as licensed and unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (such as a home) and may provide restricted access by UEs having an association with the femto cell (such as UEs in a closed subscriber group (CSG) and UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (such as two, three, or four, among other examples) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and managers described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (such as a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (such as a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving, from a network device, a first configuration message indicating quasi co-location information associated with sidelink communications between the first UE and a second UE;
   determining, based at least in part on the quasi co-location information indicated in the first configuration message, one or more quasi co-location parameters associated with the second UE;
   transmitting, to the second UE via a sidelink channel and in response to the first configuration message, a second configuration message comprising the one or more quasi co-location parameters associated with the second UE; and
   communicating, with the second UE, via the sidelink channel and based at least in part on the one or more quasi co-location parameters, one or more of data information or control information.

2. The method of claim 1, further comprising receiving a third configuration message indicating additional quasi co-location information associated with one or more of the first UE or the second UE, wherein the first configuration message and the third configuration message are received from different network devices in different cells or from different transmission reception points.

3. The method of claim 1, further comprising receiving a third configuration message indicating additional quasi co-location information associated with one or more of the first UE or the second UE, wherein the first configuration message and the third configuration message are received from one or more devices in a same cell.

4. The method of claim 1, wherein receiving the first configuration message indicating the quasi co-location information comprises receiving one or more fields indicating one or more quasi co-location parameter types, one or more quasi co-location transmission types, one or more cell identifiers identifying a device associated with the first configuration message, one or more virtual cell identifiers identifying a device associated with the first configuration message, or any combination thereof.

5. The method of claim 1, wherein the one or more quasi co-location parameters comprise one or more of downlink quasi co-location parameters, uplink quasi co-location parameters, or sidelink quasi co-location parameters.

6. The method of claim 1, wherein the one or more quasi co-location parameters comprise one or more channel-specific quasi co-location parameters, one or more signal-specific quasi co-location parameters, or both.

7. The method of claim 1, wherein receiving the first configuration message indicating the quasi co-location information comprises receiving the first configuration message in one or more of a synchronization signal block, a channel state information reference signal, a physical random access channel, or a demodulation reference signal.

8. The method of claim 1, wherein the one or more quasi co-location parameters comprise one or more of a resource allocation, a spatial relationship, a spatial filter, or a power control parameter.

9. The method of claim 1, wherein receiving the first configuration message indicating the quasi co-location information comprises receiving the first configuration message in a radio resource control message that comprises one or more indices related to a synchronization signal block, a channel state information reference signal, a physical random access channel, or a demodulation reference signal.

10. The method of claim 1, wherein determining the one or more quasi co-location parameters associated with the second UE comprises determining one or more uplink quasi co-location parameters for communication based at least in part on a downlink quasi co-location signal.

11. The method of claim 1, wherein determining the one or more quasi co-location parameters associated with the second UE comprises determining one or more downlink quasi co-location parameters for communication based at least in part on an uplink quasi co-location signal.

12. The method of claim 1, further comprising receiving, from the network device, an anchor signal, wherein the one or more quasi co-location parameters are determined based at least in part on the anchor signal.

13. The method of claim 12, wherein determining the one or more quasi co-location parameters comprises determining the one or more quasi co-location parameters based at least in part on one or more of information in the anchor signal, a signal strength of the anchor signal, or an autonomous operation by the first UE.

14. The method of claim 1, wherein determining the one or more quasi co-location parameters comprises determining the one or more quasi co-location parameters based at least in part on a quasi co-location type.

15. The method of claim 14, further comprising receiving a reference signal comprising an indication of the quasi co-location type.

16. The method of claim 1, wherein the quasi co-location information comprises one or more of a Doppler shift, a Doppler spread, an average delay, or a delay spread.

17. The method of claim 1, wherein transmitting, to the second UE via the sidelink channel, comprises unicasting, broadcasting, or multicasting to the second UE via the sidelink channel.

18. A method for wireless communication at a first user equipment (UE), comprising:
receiving, from a network device, a reference signal, the reference signal comprising one of a channel state information reference signal, a demodulation reference signal, or a physical broadcast channel;
identifying at least one quasi co-location parameter associated with sidelink communications between the first UE and a second UE based at least in part on the reference signal; and
communicating with the second UE via a sidelink channel based at least in part on the at least one quasi co-location parameter.

19. The method of claim 18, wherein communicating with the second UE comprises communicating, based at least in part on the at least one quasi co-location parameter, one or more of data information or control information.

20. The method of claim 18, wherein the at least one quasi co-location parameter comprises one or more of a resource allocation, a spatial relationship, a spatial filter, or a power control parameter.

21. The method of claim 18, wherein the at least one quasi co-location parameter comprises one or more downlink quasi co-location parameters, uplink quasi co-location parameters, or sidelink quasi co-location parameters.

22. The method of claim 18, wherein the at least one quasi co-location parameter comprises one or more channel-specific quasi co-location parameters, one or more signal-specific quasi co-location parameters, or both.

23. An apparatus for wireless communication at a first user equipment (UE), comprising: a processor; memory coupled with the processor; and instructions stored in the memory and executable by the processor to cause the apparatus to:
receive, from a network device, a first configuration message indicating quasi co-location information associated with sidelink communications between the first UE and a second UE;
determine, based at least in part on the quasi co-location information indicated in the first configuration message, one or more quasi co-location parameters associated with the second UE;
transmit, to the second UE via a sidelink channel and in response to the first configuration message, a second configuration message comprising the one or more quasi co-location parameters associated with the second UE; and
communicate, with the second UE, via the sidelink channel and based at least in part on the one or more quasi co-location parameters, one or more of data information or control information.

24. The apparatus of claim 23, wherein the instructions are further executable by the processor to cause the apparatus to receive a third configuration message indicating additional quasi co-location information associated with one or more of the first UE or the second UE, wherein the first configuration message and the third configuration message are received from different network devices in different cells or from different transmission reception points.

25. The apparatus of claim 23, wherein the instructions are further executable by the processor to cause the apparatus to receive a third configuration message indicating additional quasi co-location information associated with one or more of the first UE or the second UE, wherein the first configuration message and the third configuration message are received from one or more devices in a same cell.

26. The apparatus of claim 23, wherein receiving the first configuration message indicating the quasi co-location information comprises receiving one or more fields indicating one or more quasi co-location parameter types, one or more quasi co-location transmission types, one or more cell identifiers identifying a device associated with the first configuration message, one or more virtual cell identifiers identifying a device associated with the first configuration message, or any combination thereof.

27. The apparatus of claim 23, wherein the one or more quasi co-location parameters comprise one or more of downlink quasi co-location parameters, uplink quasi co-location parameters, or sidelink quasi co-location parameters.

28. The apparatus of claim 23, wherein the one or more quasi co-location parameters comprise one or more channel-specific quasi co-location parameters, one or more signal-specific quasi co-location parameters, or both.

29. The apparatus of claim 23, wherein receiving the first configuration message indicating the quasi co-location information comprises receiving the first configuration message in one or more of a synchronization signal block, a channel state information reference signal, a physical random access channel, or a demodulation reference signal.

30. The apparatus of claim 23, wherein the one or more quasi co-location parameters comprise one or more of a resource allocation, a spatial relationship, a spatial filter, or a power control parameter.

* * * * *